United States Patent [19]
Tanaka et al.

[11] Patent Number: 6,037,577
[45] Date of Patent: Mar. 14, 2000

[54] AMPLIFYING SOLID-STATE IMAGE PICKUP DEVICE AND OPERATING METHOD OF THE SAME

[75] Inventors: Yoriko Tanaka; Nobuo Nakamura; Natsue Sakaguchi; Yukio Endo, all of Yokohama; Yoshiyuki Matsunaga, Kamakura, all of Japan

[73] Assignee: Kabushiki Kaisha Toshiba, Kawasaki, Japan

[21] Appl. No.: 09/038,039

[22] Filed: Mar. 11, 1998

[30] Foreign Application Priority Data

Mar. 11, 1997 [JP] Japan .................................. 9-056307
Sep. 16, 1997 [JP] Japan .................................. 9-251105

[51] Int. Cl.$^7$ .................................................. H01J 40/14
[52] U.S. Cl. .................................. 250/208.1; 348/302
[58] Field of Search .......................... 250/208.1, 214 R, 250/214 LS, 370.09; 348/300–302, 304

[56] References Cited

U.S. PATENT DOCUMENTS 5,812,191 9/1998 Orava et al. .......................... 348/308

OTHER PUBLICATIONS

Toshifumi Ozaki, et al., "A Low–Noise Line–Amplified MOS Imaging Devices," IEEE Transactions On Electron Devices, vol. 38, No. 5, (May 1991), pp. 969–975.

*Primary Examiner*—Que T. Le
*Attorney, Agent, or Firm*—Oblon, Spivak, McClelland, Maier & Neustadt, P.C.

[57] ABSTRACT

An amplifying solid-state image pickup device comprises an image pickup region formed by two-dimensionally arranging photosensitive cells, each of the photosensitive cells including photoelectric conversion means, signal charge storage means, signal charge ejection means, row select means, and amplification means on a semiconductor substrate, a plurality of vertical select lines arranged in the image pickup region in a row direction, vertical select means for driving the plurality of vertical select lines, a plurality of vertical signal lines arranged in the column direction to read the outputs of the amplification means, noise suppression means provided at the ends of the plurality of vertical signal lines to capture and deduct noises and signals appearing on the plurality of vertical signal lines at time differences, horizontal select lines arranged in a column direction, horizontal read means for relaying the outputs of the horizontal select lines and the noise suppression means, horizontal select means for driving the horizontal read means, and charge adding means for adding the signal charges read to the vertical signal lines.

13 Claims, 16 Drawing Sheets

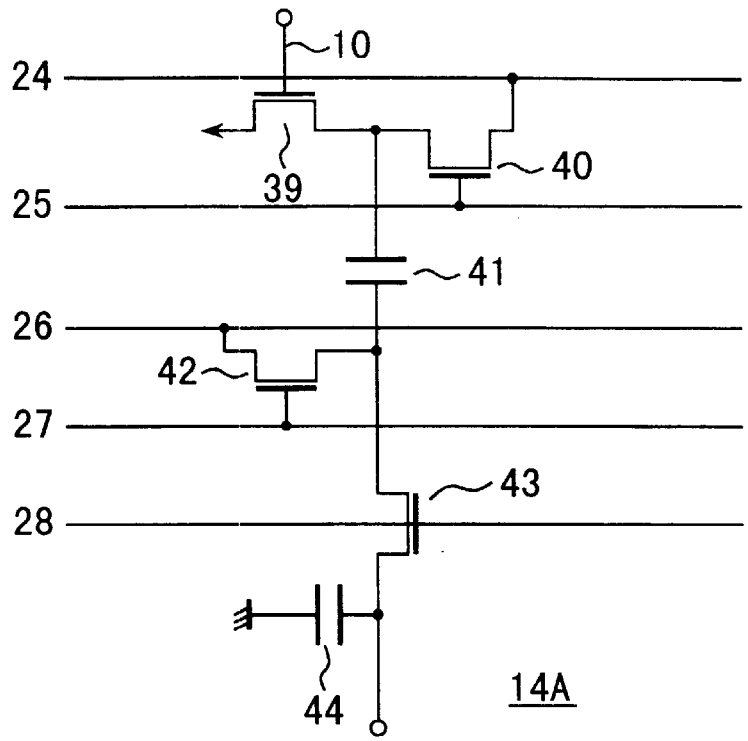
F I G. 10
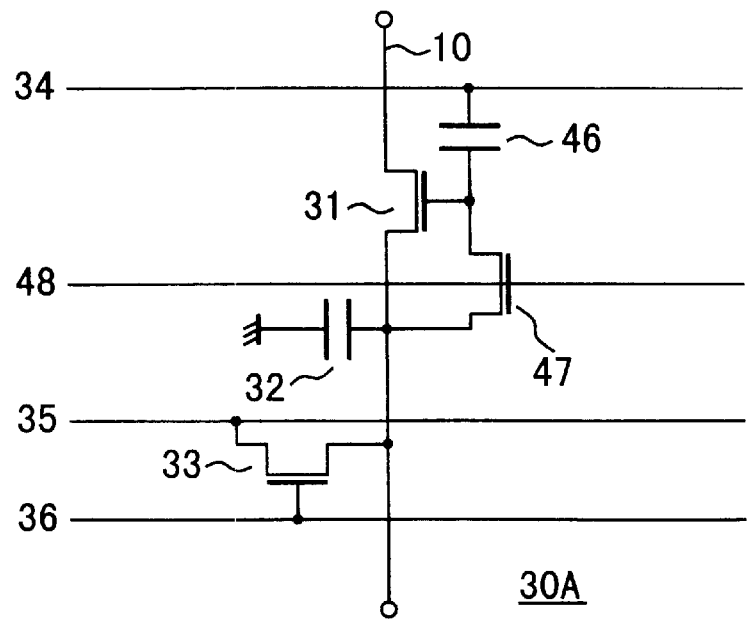
F I G. 11

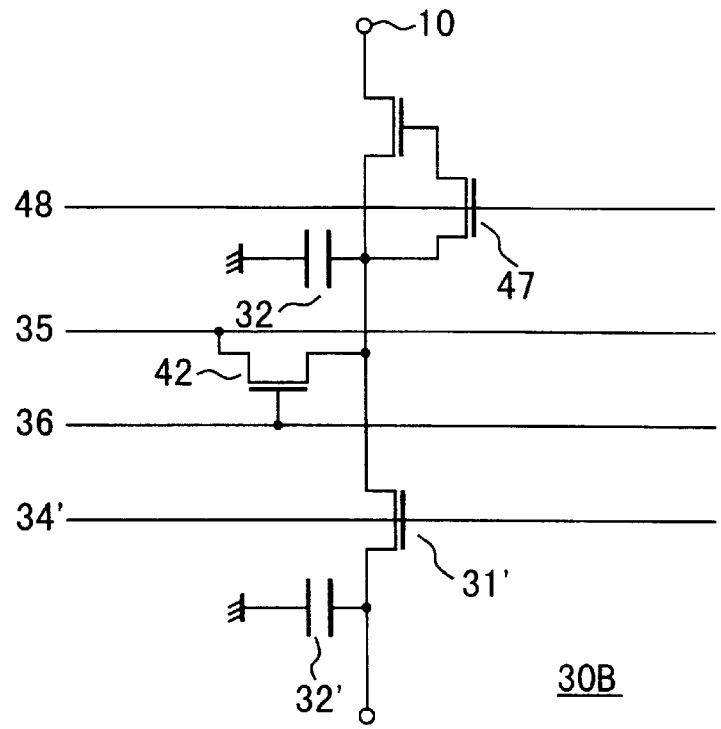
F I G. 1 2
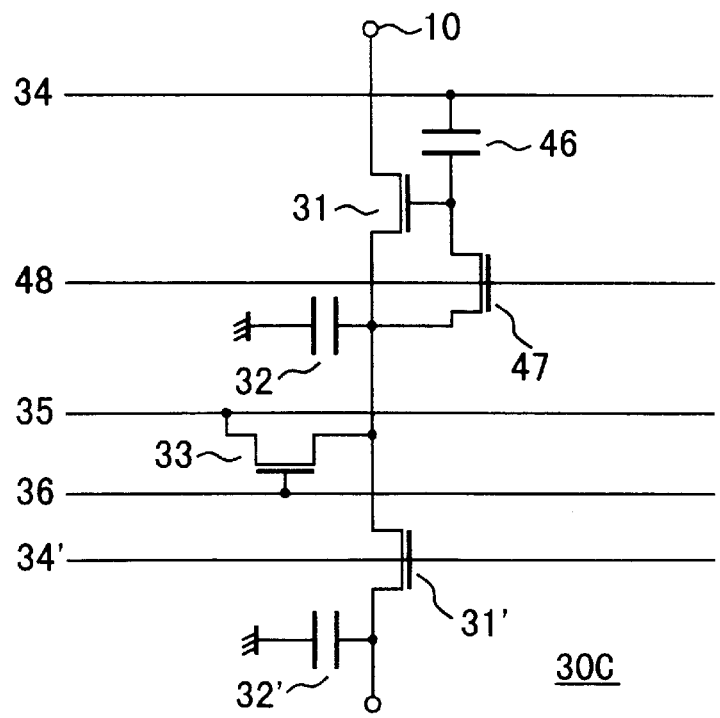
F I G. 1 3

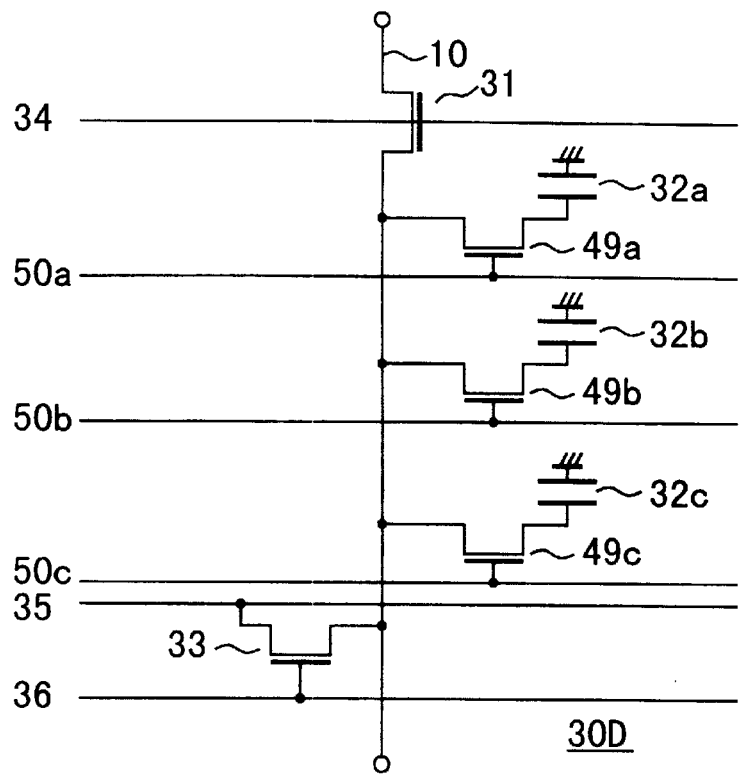
F I G. 14
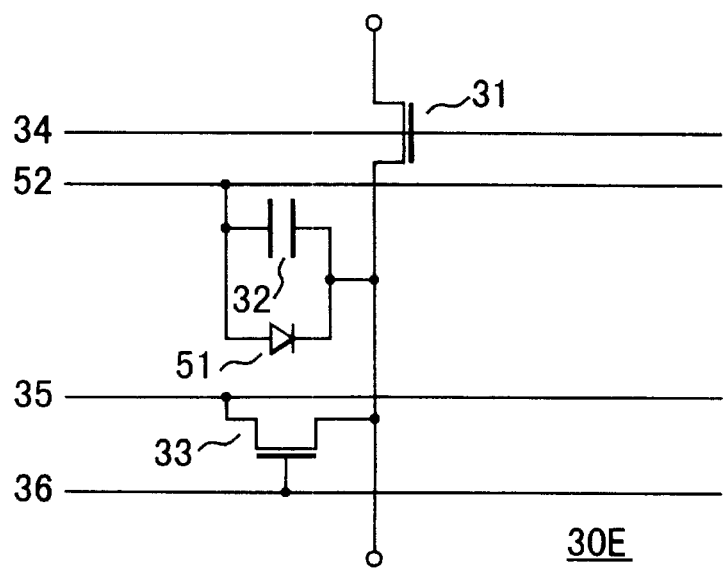
F I G. 15

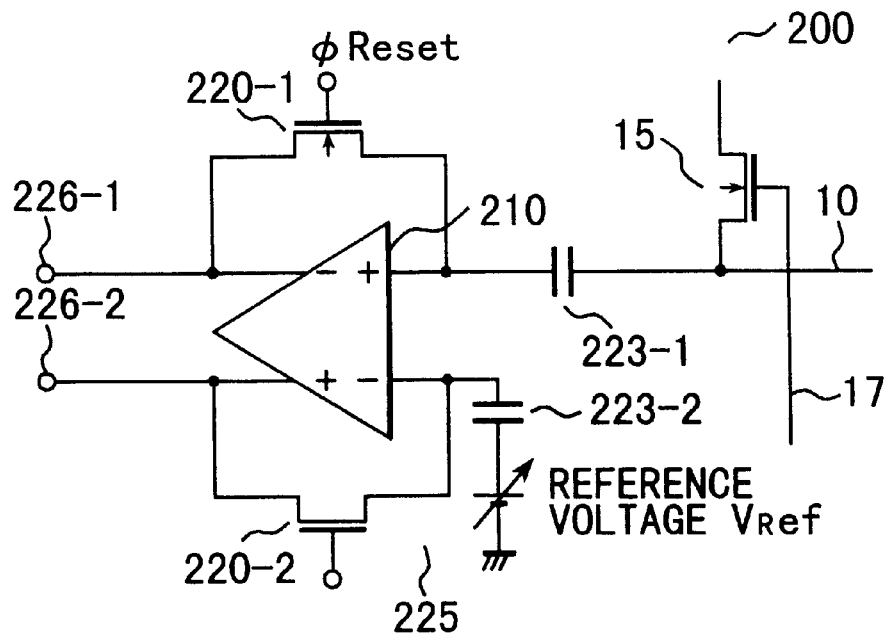
F I G. 20
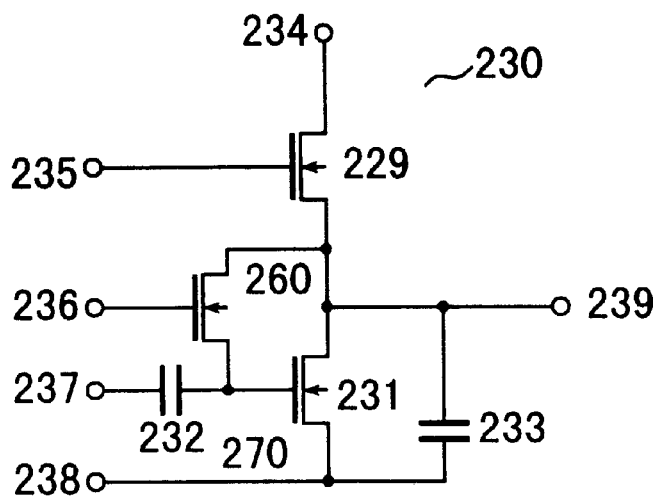
F I G. 21

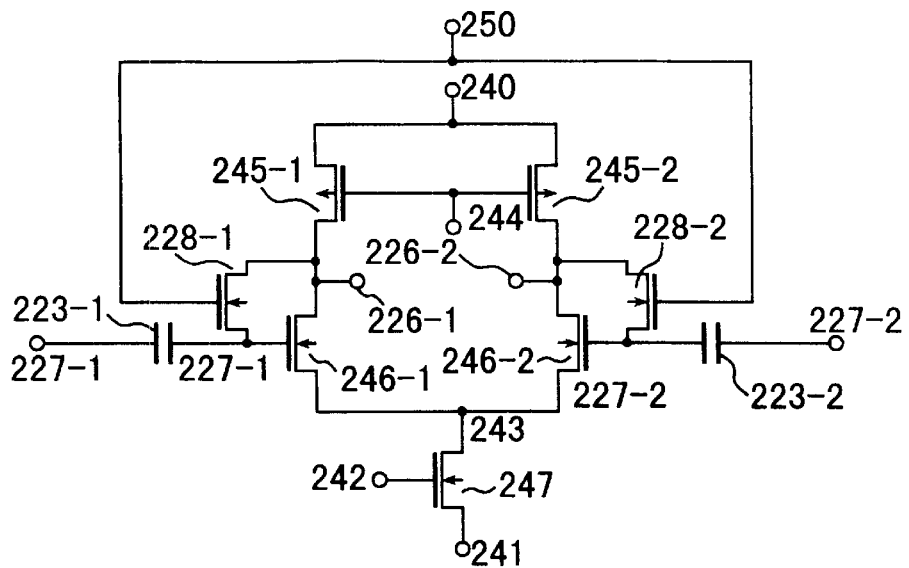
F I G. 22
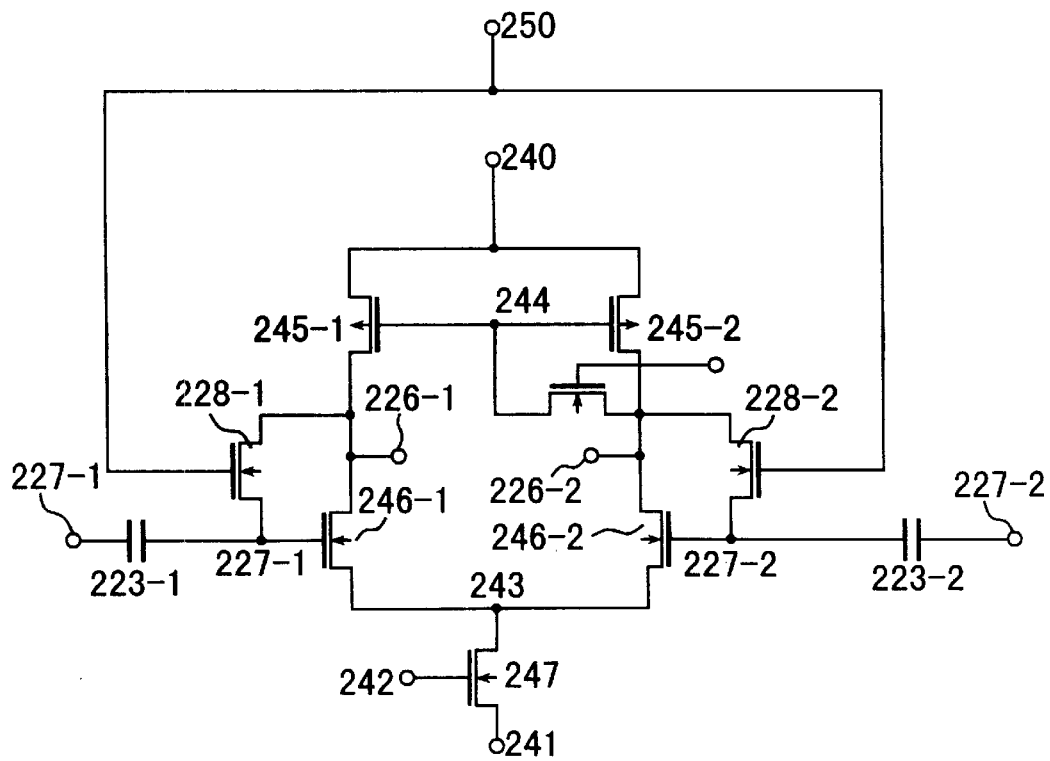
F I G. 23

AMPLIFYING SOLID-STATE IMAGE PICKUP DEVICE AND OPERATING METHOD OF THE SAME

BACKGROUND OF THE INVENTION

The present invention relates to an image pickup device for converting incident light into an electric signal, particularly to an amplifying solid-state image pickup device (particularly, MOS amplifying solid-state image pickup device) and its operating method.

FIG. 1 is a circuit diagram of an amplifying solid-state image pickup device referred to as a general amplifying MOS sensor.

In FIG. 1, unit cells are two-dimensionally arranged which comprise photodiodes $1_{11}, 1_{12}, \ldots, 1_{21}, 1_{22}, \ldots$ for performing photoelectric conversion, amplifying transistors $2_{11}, 2_{12}, \ldots, 2_{21}, 2_{22}, \ldots$ for amplifying signals of the photodiodes $1_{11}, 1_{12}, \ldots, 1_{21}, 1_{22}, \ldots$, vertical select transistors $3_{11}, 3_{12}, \ldots, 3_{21}, 3_{22}, \ldots$ for selecting a line for reading a signal, reset transistors $4_{11}, 4_{12}, \ldots, 4_{21}, 4_{22}, \ldots$ for resetting a signal charge, and signal charge transfer transistors $5_{11}, 5_{12}, \ldots, 5_{21}, 5_{22}, \ldots$ for transferring the charges of the photodiodes $1_{11}, 1_{12}, \ldots, 1_{21}, 1_{22}, \ldots$ to gate regions of the amplifying transistors $2_{11}, 2_{12}, \ldots, 2_{21}, 2_{22}, \ldots$ Though FIG. 1 shows a case in which 2×2 unit cells are arranged, more than 2×2 unit cells are actually arranged.

Horizontal address lines $7_1, 7_2, \ldots$ and charge transfer control lines $8_1, 8_2, \ldots$, and reset lines $9_1, 9_2, \ldots$ are extended to a horizontal direction from a vertical shift register 6 and are respectively connected to each of the unit cells. That is, the horizontal address lines $7_1, 7_2, \ldots$ are connected to gates of the vertical select transistors $3_{11}, 3_{12}, \ldots, 3_{21}, 3_{22}, \ldots$ to determine a line for reading a signal. The charge transfer control lines $8_1, 8_2, \ldots$ are connected to gates of the signal charge transfer transistors $5_{11}, 5_{12}, \ldots, 5_{21}, 5_{22}, \ldots$. Moreover, the reset lines $9_1, 9_2, \ldots$ are connected to gates of the reset transistors $4_{11}, 4_{12}, \ldots, 4_{21}, 4_{22}, \ldots$ Sources of the amplifying transistors $2_{11}, 2_{12}, \ldots, 2_{21}, 2_{22}, \ldots$ are connected to vertical signal lines $10_1, 10_2, \ldots$ Load transistors $13_1, 13_2, \ldots$ connected to a common gate line 11 and a common source line 12 are provided for one ends of the vertical signal lines $10_1, 10_2, \ldots$ Moreover, the horizontal select transistors $15_1, 15_2 \ldots$ through the vertical signal lines $5_{11}, 5_{12}, \ldots$ are connected to the other ends of the vertical signal lines $10_1, 10_2, \ldots$ through noise suppression circuits $14_1, 14_2, \ldots$ The horizontal select transistors $15_1, 15_2, \ldots$ are selected by a selection pulse supplied from a horizontal shift register 16 and connected to a horizontal signal line 17.

The noise suppression circuits $14_1, 14_2, \ldots$ are circuits for detecting the difference between cases in which a signal is present and absent in the vertical lines $10_1, 10_2, \ldots$ FIG. 2 is a circuit diagram showing an example of a structure of the noise suppression circuits.

In FIG. 2, the vertical signal line 10 is connected to the gate of a slice transistor 19. A slice capacitor 20 and a slice capacitor reset transistor 21 are connected to the source of the slice transistor 19 and a slice charge storage capacitor 21 and a slice charge storage capacitor reset transistor 22 are connected to the drain of the slice transistor 19 as illustrated. Moreover, FIG. 2 shows a slice-capacitor reset transistor common source line 24, slice capacitor reset transistor common gate 25, a slice-capacitor control line 26, a DC line 27, and a slice-charge storage capacitor reset transistor common gate 28.

FIG. 3 is a timing chart for explaining operations of a conventional device.

A BL pulse shows a period I for suppressing noises of a noise suppression circuit 14 and a period II for reading signals of the photodiodes 1 to the horizontal signal line 17.

First, the period I is described below. When an address pulse $S1_1$ which makes the horizontal address line $7_1$ high-level is applied, only a transistor for selecting the line is turned on, a source follower circuit is constituted with the amplifying transistors $2_{11}$ and $2_{12}$ and the load transistors $13_1$ and $13_2$ in this row, and a voltage almost equal to the gate voltage of the amplifying transistors $2_{11}$ and $2_{12}$ appears on the vertical signal lines $10_1$ and $10_2$.

Moreover, a reset pulse $S2_1$ is generated in a reset line $8_1$ and a reset transistor $4_1$ is turned on, and thereby a voltage when there is no signal is generated in the gate of the amplifying transistor $2_{11}$. In this case, only a noise voltage when there is no signal is generated in the vertical signal lines $10_1$ and $10_2$. That is, only noises are applied to the gate of the slice transistor 19.

A slice capacitor reset pulse $S3_1$ is applied to a slice-capacitor reset transistor common gate 25 and the slice capacitor 20 is preset.

Then, a first slice pulse $S4_1$ is applied to the slice capacitor control line 26 connected to the slice capacitor 20 and some of the charges stored in the slice capacitor 20 are transferred to the drain of the slice transistor 19 through the gate channel of the transistor 19. Charges corresponding to the noise voltage applied to the gate of the slice transistor 19 are left in the slice capacitor 20.

The charges transferred from the drain of the slice transistor 19 and entering the slice charge storage capacitor 22 also have a quantity related to noise charges. However, a first slice-charge storage capacitor reset pulse $S5_1$ is applied to the slice-charge storage capacitor reset transistor common gate 28 and the slice charge stored capacity is reset.

Moreover, a second slice pulse $S6_1$ and a second slice charge storage capacitor reset pulse $S7_1$ are applied to accurately keep a noise applied state.

Then, a signal charge transfer pulse $S8_1$ is applied to the charge transfer control line $9_1$, the signal charge transfer transistor $5_{11}$ is turned on, and signal charges are transferred to the gate region of the amplifying transistor $2_{11}$. A signal voltage appears on the vertical signal lines $10_1$ and $10_2$ and it is applied to the gate of the slice transistor 19.

Then, a third slice pulse $S9_1$ is applied and some of the charges stored in the slice capacitor 20 pass through the gate channel of the slice transistor 19 and are transferred to the slice charge storage capacitor 22. Because the charges corresponding to noises is stored in the slice capacitor 20 and a signal voltage on which noises are superimposed is applied to the gate of the slice transistor 19, only charges corresponding to the signal from which noise components are deducted are transferred to the slice charge storage capacitor 22. Accordingly, only signal charges without noise are stored in the slice charge capacitor.

Then, in the period II, horizontal select pulses $S10_{11}$ and $S10_{12}$ are respectively applied to the gates of the horizontal select transistors $15_1$ and $15_2$ and signal charges in the slice charge storage capacitor 22 are read out to the horizontal signal line 17. Read signals $S11_{11}$ and $S11_{12}$ respectively correspond to signals of the photodiodes $1_{11}$ and $1_{12}$.

It is possible to read signals from the subsequent rows similarly to the case.

As described above, even a type of MOS image pickup device including an amplifying transistor in the unit pixel has sensitivity lower than that of an image pickup device having a CCD. This is because the performance of an amplifying transistor present in the unit pixel of an amplifying MOS image pickup device is almost the same as the performance of a transistor of an output amplifier present at the final stage of CCD image pickup devices when the fabrication processes of the both transistors are the same.

A CCD image pickup device is a device hardly having noises and therefore, it is estimated that noises are generated by only an output amplifier. In the case of an amplifying MOS image pickup device, however, even after amplification is performed by the unit pixel, new noises are superimposed in several transistors because signals pass through the transistors until they are output to an output terminal.

FIG. 4 shows a example of a conventional amplifier used for an amplifying solid-state image pickup device, which was proposed by T. Ozaki et al. in 1991 (T. Ozaki, H. Kinugusa, and T. Nishida, "A low-Noise Line-Amplified MOS image pickup devices", IEEE Trans. Electron Devices, Vol. 38, no. 8, pp. 969–975, May 1991").

In the case of a conventional solid-state image pickup device, the amplifier in the document is connected to each signal line or pixel to amplify a pixel signal. In the case of this circuit, the output of an amplifier 53 is connected with an input terminal through a capacitance 52 connected with an amplifier in parallel and a gate switch 54 is connected with an input through a bias capacitance (coupling capacitance) 50. Thereby, as shown in FIG. 5, an operating point is shifted along the curve to increase the dynamic range of output. In the case of this circuit, an operating point 67 moves (AUTO ZERO BIASING) so that $V_{IN}$ becomes equal to $V_{OUT}$ when the switch 54 is turned on and the charged stored in the capacitance 50 are read to and amplified by an amplifier. Thereafter, the switch 54 is turned on again and the amplifier is reset. This circuit sets the amplifier to a high gain and controls the gain by the capacitance 52 connected with the amplifier in parallel.

FIG. 6 shows a variable gain amplifier based on a general differential amplifier. This circuit makes it possible to control a gain by adjusting the resistance value $R_0$ of a resistance and the gain is shown by the following expression.

$$G=(R_2/2R_2)(1+R_2/2R_0)(e1-e2)$$

When utilizing the circuit in FIG. 6 by using a differential amplifier constituted with a MOS transistor, a variable gain control circuit using a MOS transistor is obtained. However, this structure becomes complex and the resistance in FIG. 6 prevents the power consumption from reduction. Moreover, because the number of component transistors increases, a simpler circuit is desired.

As described above, a conventional variable gain amplifier used for a MOS amplifying solid-state image pickup device has a complex structure and problems of noises due to a threshold deviation of a transistor and coupling of signal line capacitance and easily causes fluctuation in gains and signal noises.

BRIEF SUMMARY OF THE INVENTION

It is an object of the present invention to provide an amplifying solid-state image pickup device not inferior to a CCD image pickup device in sensitivity and its operating method.

It is another object of the present invention to provide an amplifying solid-state image pickup device capable of decreasing gain fluctuation and signal noises and provided with an amplifier to be easily controlled.

An amplifying solid-state image pickup device of the first aspect of the present invention comprises: an image pickup region formed by two-dimensionally arranging photosensitive cells, each of the photosensitive cells including photoelectric conversion means, signal charge storage means, signal charge ejection means, row select means, and amplification means on a semiconductor substrate; a plurality of vertical select lines arranged in the image pickup region in a row direction; vertical select means for driving the plurality of vertical select lines; a plurality of vertical signal lines arranged in the column direction to read the outputs of the amplification means; noise suppression means provided at the ends of the plurality of vertical signal lines to capture noises and signals appearing on the plurality of vertical signal lines at time differences and deduct the noise from the signals; horizontal select lines arranged in a column direction; horizontal read means for relaying the outputs of the horizontal select lines and the noise suppression means; horizontal select means for driving the horizontal read means; and charge adding means for adding the signal charges read to the vertical signal lines. Where, the charge adding means includes vertical signal line charge transfer means for transferring charges to the vertical signal lines and an added charge storage capacitor for storing the charges transferred by the vertical signal line charge transfer means. The noise suppression means includes at least one MOS transistor and the outputs of the charge adding means is input to a gate of the MOS transistor.

An amplifying solid-state image pickup device operating method of the first aspect of the present invention, which includes the steps of driving a plurality of vertical select lines arranged in the row direction of an image pickup region formed by two-dimensionally arranging photosensitive cells respectively comprising photoelectric conversion means, signal charge storage means, signal charge election means, row select means, and amplification means on a semiconductor substrate, reading the outputs of the amplification means by a plurality of vertical signal lines arranged in the column direction, capturing and deducting noises and signals appearing on the vertical signal lines at time differences by noise suppression means provided at the ends of the vertical signal lines, relaying the outputs of horizontal select lines arranged in the column direction of the image pickup region and noise suppression means by horizontal read means, and driving the horizontal read means by horizontal select means; the method comprises the steps of: performing a plurality of times of amplification for signals for one time stored in the signal charge storage means; and deducting noises obtained by adding amplified noises a plurality of times in the step of performing a plurality of times of amplification from the signals obtained by adding the amplified signals generated on the vertical signal lines a plurality of times in the step by the noise suppression means. Where, sensitivities are changed by changing the number of times of addition in the step of performing a plurality of times of amplification.

Another amplifying solid-state image pickup device of the first aspect of the present invention comprises: an image pickup region formed by two-dimensionally arranging photosensitive cells respectively including photoelectric conversion means, signal charge storage means, signal charge ejection means, row select means, and amplification means on a semiconductor substrate; a plurality of vertical select lines arranged in the image pickup region in a row direction; vertical select means for driving the plurality of vertical select lines; a plurality of vertical signal lines arranged in the column direction to read the outputs of the amplification means; noise suppression means provided at the ends of the vertical signal lines to capture and deduct noises and signals appearing on the plurality of vertical signal lines at time differences; horizontal select lines arranged in a column direction; horizontal read means for relaying the outputs of the horizontal select lines and the noise suppression means; horizontal select means for driving the horizontal read means; and voltage amplification means for amplifying signal voltages read to the vertical signal lines.

Another amplifying, solid-state image pickup device operating method of the first aspect of the present invention, which includes the steps of driving a plurality of vertical select lines arranged in the row direction of an image pickup region formed by two-dimensionally arranging photosensitive cells respectively comprising photoelectric conversion means, signal charge storage means, signal charge election means, row select means, and amplification means on a semiconductor substrate, reading the outputs of the amplification means by a plurality of vertical signal lines arranged in the column direction, capturing and deducting noises and signals appearing on the vertical signal lines at time differences by noise suppression means provided at the ends of the vertical signal lines, relaying the outputs of horizontal select lines arranged in the column direction of the image pickup region and noise suppression means by horizontal read means by setting charge integration means comprising vertical signal line charge transfer means and a variable voltage amplification and storage capacitance making it possible to control a variable electric capacity value from an external unit between the vertical signal lines and the noise suppression means, and driving the horizontal read means by horizontal select means; the method comprises the steps of: supplying a capacitance variable signal from an external unit; and controlling the sensitivity by changing the electric capacity values of the voltage amplification and storage means.

In the first aspect of the present invention, the influence of noises to be superimposed after a noise suppression circuit is reduced by amplifying charges a plurality of times with the unit pixel of the amplifying MOS image pickup device, integrating the amplified charges a plurality of times, and inputting them to the noise suppression circuit. Or, the charges amplified with the unit pixel are not amplified in a charge region but they are changed to a small capacity, and they are amplified only in a voltage region and input to the noise suppression circuit. In this case, the noise suppression circuit must be the gate input type.

By using the structure, noises of the amplifying MOS image pickup device are almost determined by the noises of an amplifying transistor of the unit pixel. Therefore, the sensitivity becomes almost equal to that of a CCD image pickup device or higher than that of a CCD by a value equivalent to the amplifying factor immediately before a noise amplifier.

An amplifying solid-state image pickup device of the second aspect of the present invention comprises: a plurality of photoelectric conversion sections arranged in rows and columns and respectively serving as a photoelectric conversion device and an amplification device for amplifying the signals of the photoelectric conversion device; a plurality of vertical signal lines for reading signals from the photoelectric conversion sections; a vertical select circuit for selecting the row-arranged photoelectric conversion sections; a horizontal select circuit for selecting the vertical signal lines; horizontal signal lines for reading signals from the vertical signal lines in accordance with the selection of the vertical signal lines; an amplifier for amplifying the signals of the horizontal signal lines, which has a negative feedback path; and means for selecting the vertical signal lines and resetting the amplifier. Where, the horizontal signal lines have a plurality of horizontal signal lines for respectively reading the signals of a plurality of vertical select lines selected by the horizontal select circuit and the amplifier has a plurality of amplifiers for respectively amplifying signals of a plurality of the horizontal signal lines.

Another amplifying solid-state image pickup device of the present invention comprises: a plurality of photoelectric conversion sections arranged in rows and columns and respectively including a photoelectric conversion device and an amplification device for amplifying the signal of the photoelectric conversion device; a plurality of vertical signal lines for reading signals from the photoelectric conversion sections; a vertical select circuit for selecting the photoelectric conversion sections in a row direction; a horizontal select circuit for selecting the plurality of vertical signal lines; a plurality of amplifiers for amplifying the signals of the vertical signal lines, each of which has a negative feedback path; horizontal signal lines for reading signals from the vertical signal lines in accordance with the selection of the vertical signal lines; and means for selecting the vertical signal lines and resetting the amplifier.

Preferred embodiments of the second aspect of the present invention are shown below.

(1) The horizontal signal line includes a plurality of horizontal signal lines for respectively reading signals of a plurality of vertical select lines selected by the horizontal select circuit.

(2) A dummy circuit for reading a reference signal to the horizontal signal lines and the amplifier comprises a differential amplifier for amplifying the difference between the signals of the horizontal signal lines and the reference signal of the dummy circuit.

(3) The amplifier comprises a capacitor and amplification unit connected to the signal lines in series, and a switching circuit for equalizing the potential of the input of the amplification unit with that of the output of the unit.

(4) Means for turning on the switching circuit before reading signals to the signal lines and setting the voltage of the input of the amplifier to a predetermine value is further provided.

(5) The amplifier reads a plurality of bits including one bit for one-time operation of the switching circuit.

(6) The amplifier comprises a MOS differential amplifier including a MOS inverter circuit provided with a load MOS transistor and a driving MOS transistor, a pair of load MOS transistors, a pair of differential input transistors, and a constant current source and obtain any gain by directly controlling the gate potential of the load MOS transistor and changing gm (mutual conductance).

(7) Fine adjustment of gain is performed by connecting the gate of the load MOS transistor with the output of the transistor through a MOS transistor and controlling the gate.

(8) The amplifier comprises a switching circuit for forming a feedback circuit and equalizing the potentials of the input and output of the MOS differential amplifier and means in which a reset pulse and a signal pulse are alternately set in time series and the input of the entire circuit including the feedback circuit is set to a reference voltage at the time of resetting, the feedback circuit is turned on when the switching circuit is turned on, and the potentials of the input and output of the amplifier are equalized to drive the amplifier at the timing of amplifying and outputting an input signal at the time of non-resetting.

According to the second aspect of the present invention, control is easily made because a gain is controlled by controlling the gate voltages of the load MOS transistors of MOS-inverter and differential amplifiers and thereby changing gm. Moreover, a gain is controlled in an amplifier by increasing a dynamic range by a capacitance connected to the input in series and a feedback circuit set between the input and output. Moreover, it is possible to perform fine adjustment of a gain by connecting the gate and output of a PMOS each other through an NMOS transistor and controlling the gate voltage of the PMOS.

Furthermore, by being used to amplify a pixel signal in the horizontal signal line and vertical signal line of a solid-state image pickup device, it is possible to adjust a gain in accordance with an external control input. Thereby, the circuit of an amplifier is simplified and enlargement of an operation margin of an amplifier, stabilization of a gain, and improvement of an S/N ratio can be achieved by a capacitance connected to a signal line in series and a reset circuit comprising a reset transistor. An amplifying solid-state image pickup device having the amplifier can suppress noises in an image and stably obtain signal information at a small signal level.

The present invention makes it possible to provide an amplifying solid-state image pickup device not inferior to a CCD image pickup device in sensitivity and its operating method.

Moreover, in the case of the present invention, a gain is made variable by adding a negative feedback circuit between the input and output of an amplifier to control the gate of a load MOS transistor or connecting the gate and output of the load MOS transistor each other through an NMOS transistor to control the gate of the load MOS transistor and thereby, changing the gm of the load MOS transistor. According to the circuit structure, an S/N ratio can be improve and an effect for a threshold deviation can be obtained. Furthermore, by adding a dummy circuit and using the signal as one of differential inputs, it is possible to reduce noises.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE SEVERAL VIEWS OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 10 is a circuit diagram showing a structure of a gate-input noise suppression circuit;

FIG. 11 is a circuit diagram showing another structure of the charge adding circuit in FIG. 7;

FIG. 12 is an illustration showing a charge adding circuit for performing correction of threshold fluctuation and addition of charges separately;

FIG. 13 is a circuit diagram showing still another structure of the charge adding circuit in FIG. 7;

FIG. 14 is a circuit diagram showing a structure of a charge adding circuit for amplifying a voltage by transferring signal charges once;

FIG. 15 is a circuit diagram showing another structure of a charge adding circuit for amplifying a voltage by transferring signal charges once;

FIG. 20 is a circuit diagram of an amplifier used for the amplifying solid-state image pickup device according to the fourth embodiment of the present invention;

FIG. 21 is a circuit diagram of an amplifier used for the amplifying solid-state image pickup device according to the fourth embodiment of the present invention;

FIG. 22 is a circuit diagram of an amplifier used for the amplifying solid-state image pickup device according to the fourth embodiment of the present invention;

FIG. 23 is a circuit diagram of an amplifier used for the amplifying solid-state image pickup device according to the fourth embodiment of the present invention.

DETAILED DESCRIPTION OF THE INVENTION

Embodiments of the present invention are described below by referring to the accompanying drawings.

Figure 7:
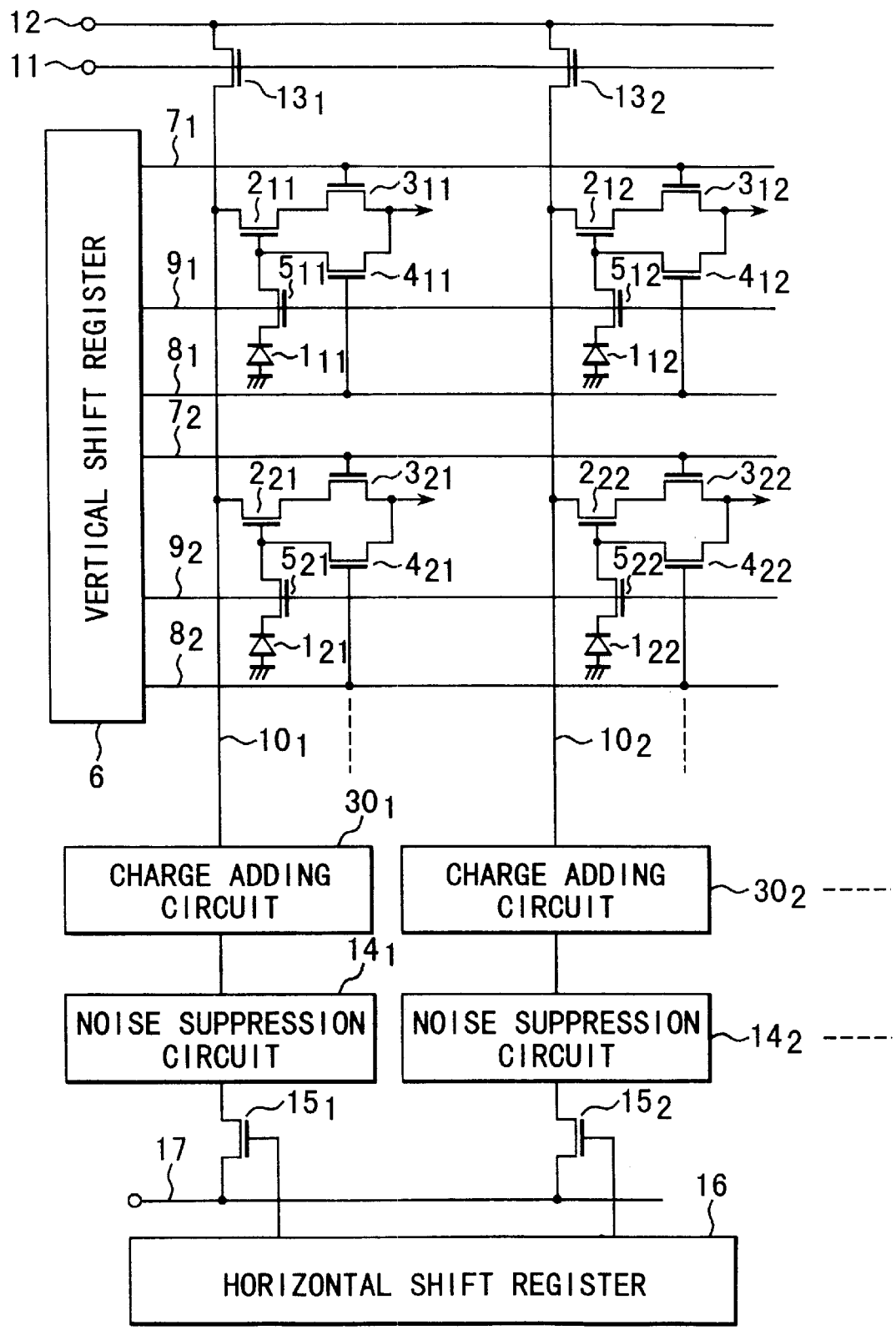
FIG. 7 is a circuit diagram showing the structure of the amplifying solid-state image pickup device according to the first embodiment of the present invention.

FIG. 7 is a circuit diagram showing a structure of the amplifying solid-state image pickup device according to the first embodiment of the present invention. In the embodiments described below, a portion same as that in the conventional example is provided with the same reference number and its description is omitted.

In FIG. 7, unit cells are two-dimensionally arranged which comprises the photodiodes $1_{11}, 1_{12}, \ldots, 1_{21}, 1_{22}, \ldots$ and amplifying transistors $2_{11}, 2_{12}, \ldots, 2_{21}, 2_{22}, \ldots,$ vertical select transistors $3_{11}, 3_{12}, \ldots, 3_{21}, 3_{22}, \ldots,$ reset transistors $4_{11}, 4_{12}, \ldots, 4_{21}, 4_{22}, \ldots,$ and signal charge transfer transistors $5_{11}, 5_{12}, \ldots 5_{21}, 5_{22}, \ldots.$ In FIG. 7, a case is shown in which 2×2 unit cells are arranged. Actually, however, more than 2×2 unit cells are arranged.

Horizontal address lines $7_1, 7_2, \ldots$ and charge transfer control lines $8_1, 8_2, \ldots,$ and reset lines $9_1, 9_2, \ldots$ are extended from a vertical shift register 6 and are respectively connected to each of the unit cells.

The load transistors $13_1, 13_2, \ldots$ connected to the common gate line 11 and common source line 12 are provided for one ends of the vertical signal lines $10_1$ and $10_2, \ldots.$ Moreover, the horizontal select transistors $15_1, 15_2, \ldots$ are connected to the other ends of the vertical signal lines $10_1, 10_2, \ldots$ through the charge adding circuits $30_1, 30_2, \ldots$ and noise suppression circuits $14_1, 14_2, \ldots.$ The horizontal select transistors $15_1, 15_2, \ldots$ are selected by a select pulse supplied from the horizontal shift register 16 and connected to the horizontal signal line 17.

Figure 8:
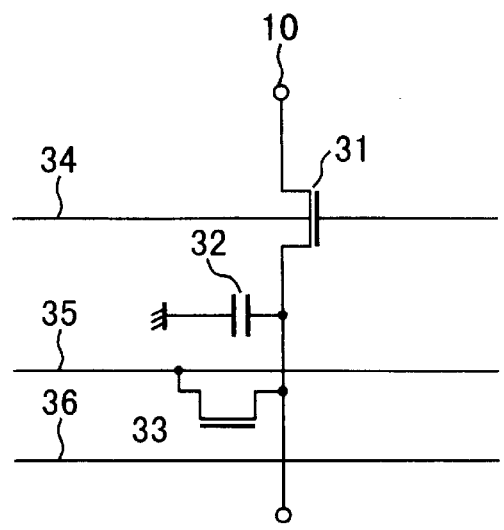
FIG. 8 is a circuit diagram showing a structure of the charge adding circuit in FIG. 7.

FIG. 8 is a circuit diagram showing an example of a structure of the charge adding circuits $30_1, 30_2, \ldots$ In FIG. 8, a charge adding circuit 30 comprises an amplified charge transfer transistor 31, in which a source and a drain are connected to the vertical signal line 10, a charge adding capacitor 32 and a charge adding capacitor reset transistor 33 connected to the drain of the vertical signal line 31. Moreover, FIG. 8 shows a amplified charge transistor common gate 34, DC line 35, and charge adding capacitor rest transistor 36.

Figure 9:
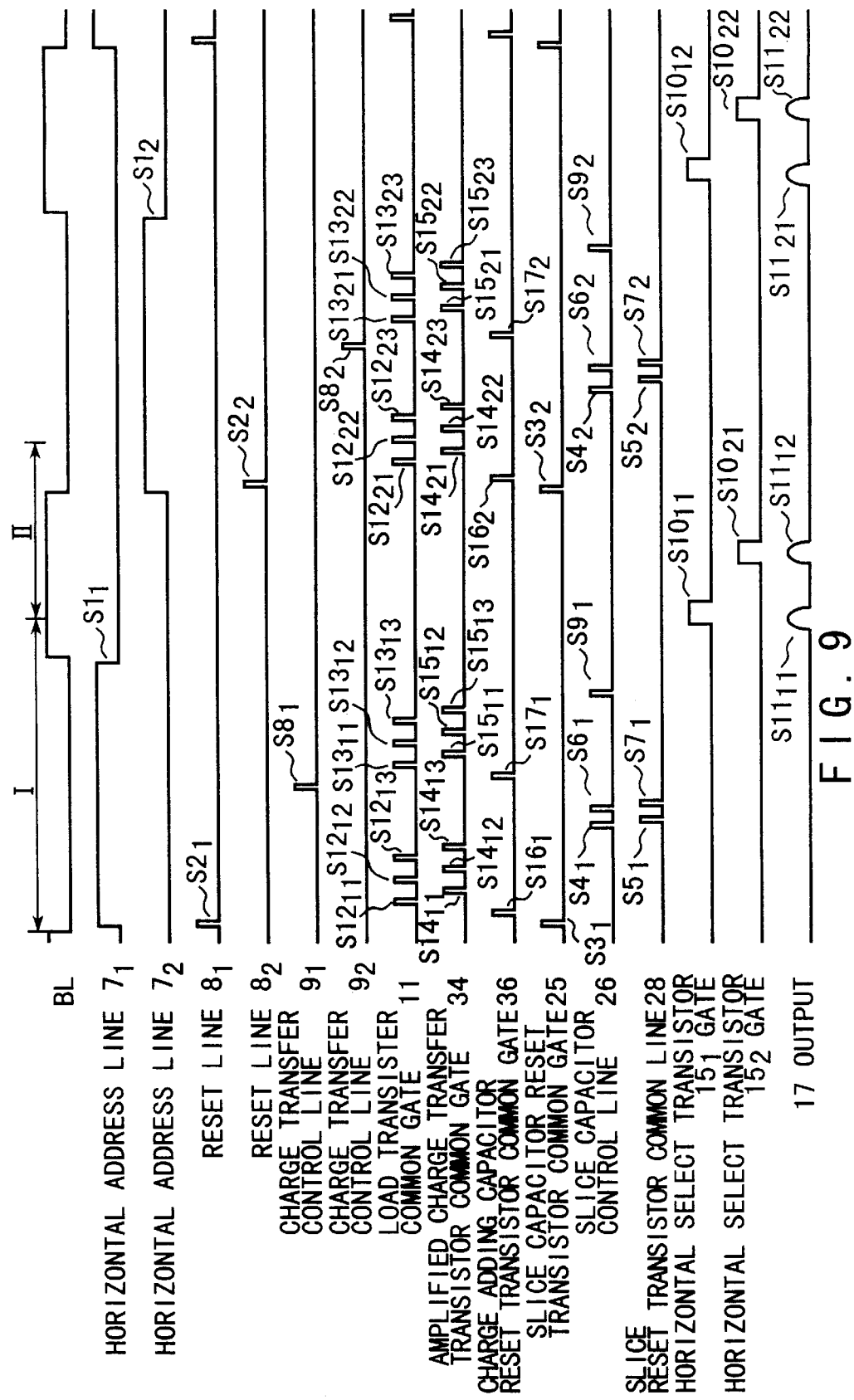
FIG. 9 is a timing chart for explaining operations of the amplifying solid-state image pickup device in FIG. 7.

Operations of an amplifying solid-state image pickup device having the structure are described below by referring to the timing chart in FIG. 9. A signal same as that of the conventional example is provided with the same reference number and its description is omitted.

First, because a load transistor 13 is pulse-driven, a pulse voltage is input to the load transistor common gate 11. The load transistor 13 is turned on and the vertical signal lines $10_1, 10_2, \ldots$ are reset so as to have a voltage almost equal to the voltage of the load transistor common source 12. Thereafter, when the load transistor 13 is turned off, charges are discharged through the amplifying transistor 2 on a addressed row and the gate channel of the vertical select transistor 3 and the potentials of the vertical signal lines $10_1, 10_2, \ldots$ become substantially equal to the potential of the gate channel of the amplifying transistor 2.

The charges stored in the capacitance of the vertical signal line 10 can be transferred to the charge adding capacitor 32 when the amplified charge transfer transistor 31 is turned on. FIG. 9 shows a case in which the transfer operation is performed three times.

First, because the charge adding capacitor 32 is reset, a first charge adding capacitor reset pulse $S16_1$ is applied to a charge adding capacitor reset transistor common gate 36. When only noises are applied to the amplifying transistor 2, a first under-noise vertical signal line reset pulse $S12_{11}$ is applied to the load transistor common gate 11 and a first under-noise amplified charge transfer pulse $S14_{11}$ is applied to an amplified charge transfer transistor common gate 34 and noise charges amplified by the charge adding capacitor 32 are transferred.

Then, second and third under-noise signal line reset pulses $12_{12}$ and $12_{13}$ and second and third under-noise amplified charge transfer pulses $14_{12}$ and $14_{13}$ are applied. Total noise charges of three times accumulation are stored in the charge adding capacitor 32. In this case, the added noise output from the charge adding circuit 30 is captured by the noise suppression circuit 14. An operation of the noise suppression circuit 14 is the same as that in the timing chart shown in FIG. 3.

Then, the signal charge transfer transistor 5 is turned on and the signal of the photodiode 1 is transferred to the gate of the amplifying transistor 2. Then, a second charge adding capacitor rest pulse $S17_1$ is applied to a charge adding capacitor reset transistor common gate 36.

Thereafter, first, second, and third under-signal vertical signal line reset pulses $S13_{11}, S13_{12},$ and $S13_{13}$ are applied to the load transistor common gate 11 and first, second, third under-signal amplified charge transfer pulses $15_{11}, 15_{12},$ and $15_{13}$ are applied to the amplified charge transfer transistor common gate 34, and total signal charges of three times accumulation are stored in the charge adding capacitor 32. In this case, the added noise output of the charge adding circuit 30 is captured by the noise suppression circuit 14.

Figure 1:
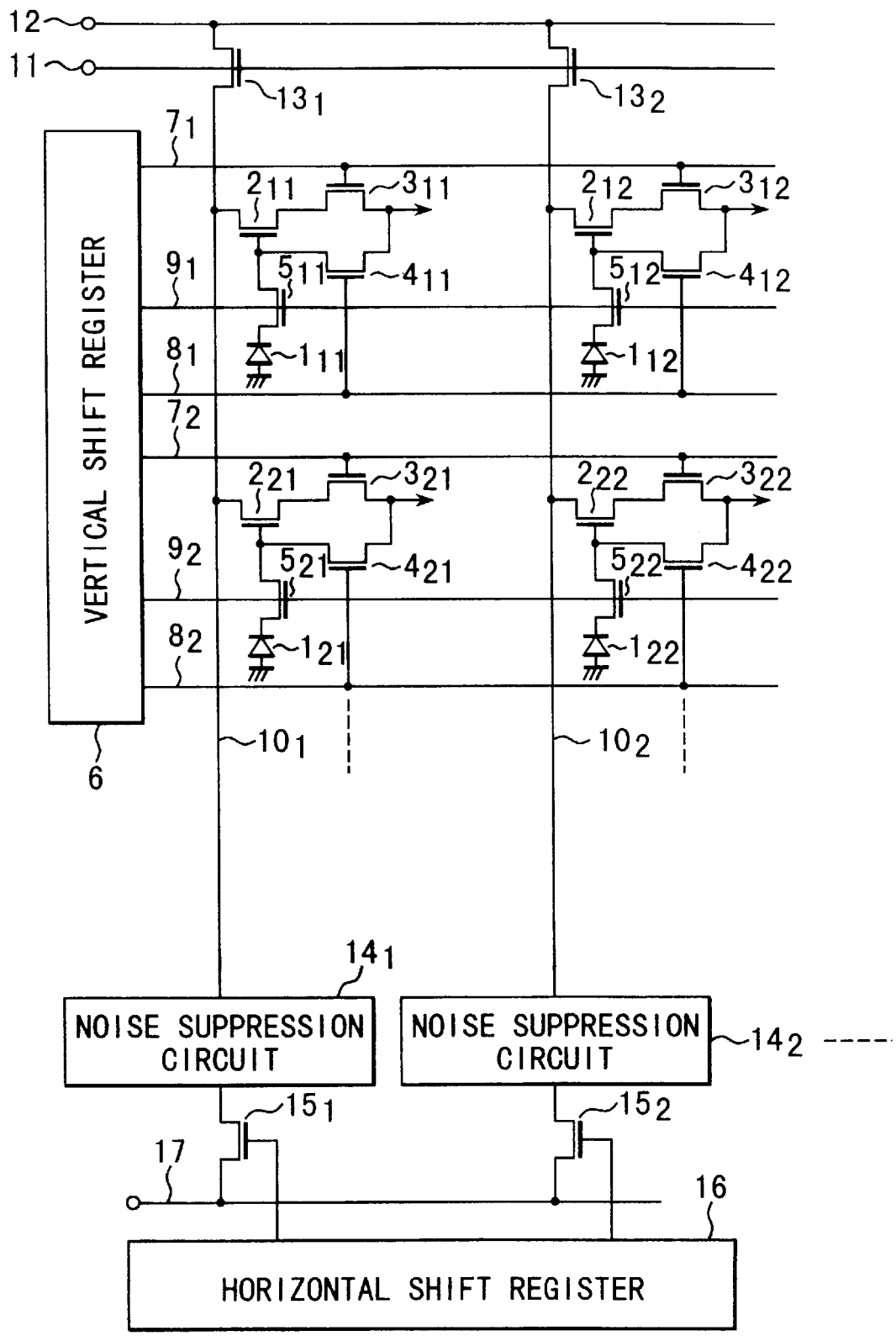
FIG. 1 is a circuit diagram of an amplifying solid-state image pickup device referred to as a general amplifying MOS sensor.
Figure 2:
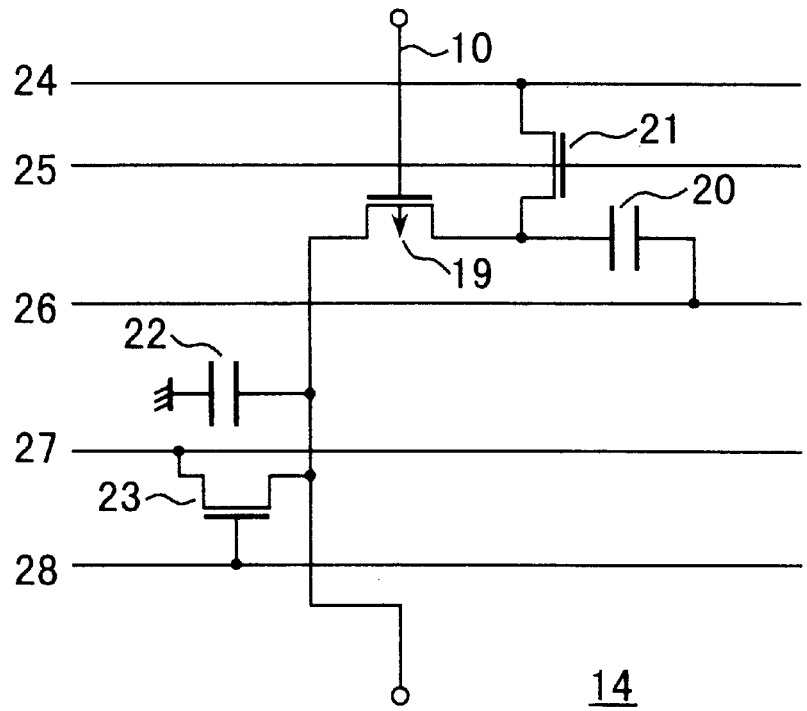
FIG. 2 is a circuit diagram showing a structure of the noise suppression circuit in FIG. 1.
Figure 4:
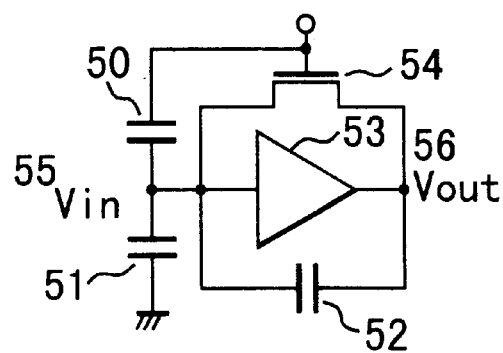
FIG. 4 is an example of an amplifier used for a conventional solid-state image pickup device.
Figure 3:
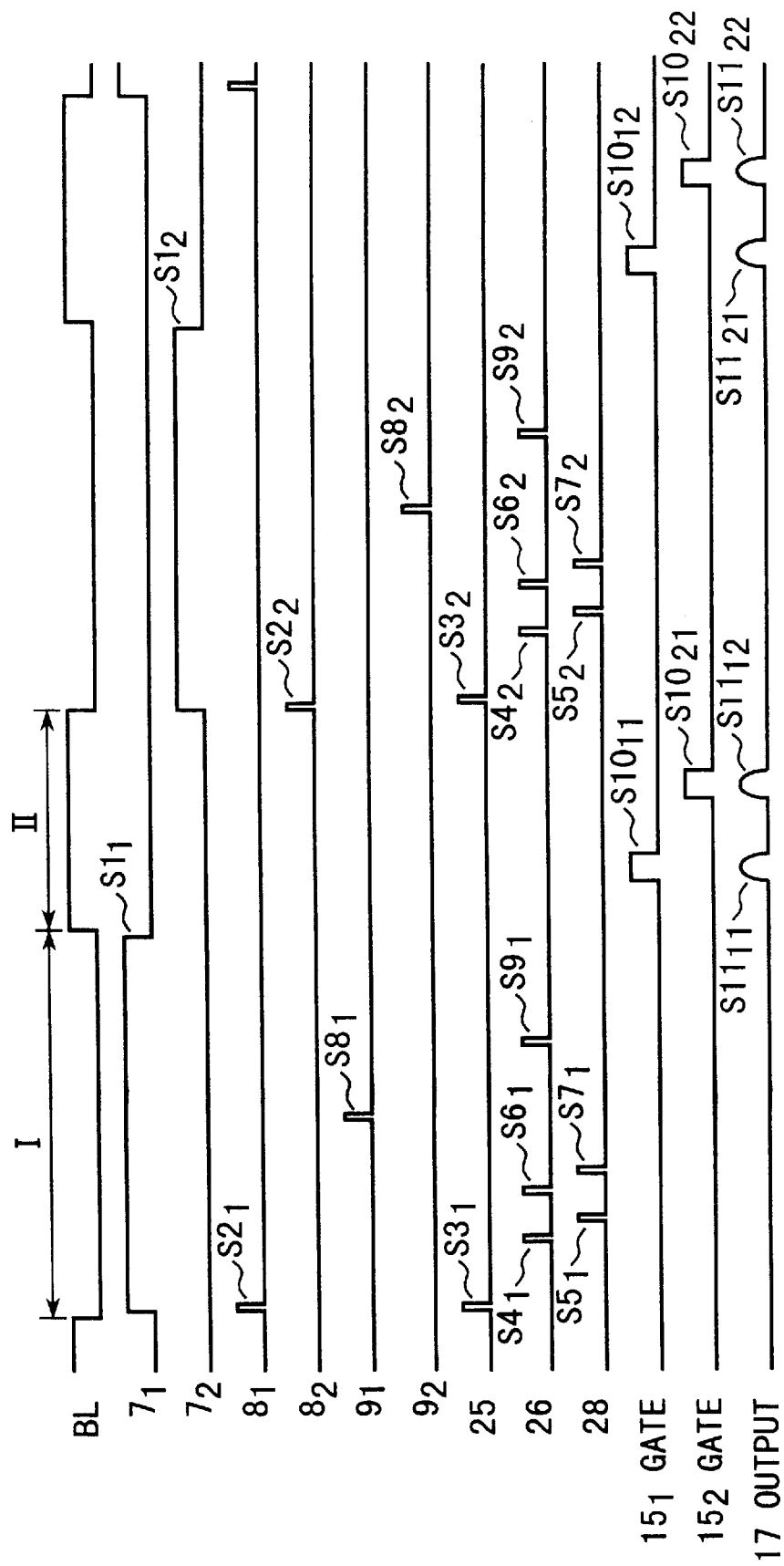
FIG. 3 is a timing chart for explaining operations of the amplifying solid-state image pickup device in FIG. 2.

The operation of the noise suppression circuit 14 is the same as that in the timing chart shown in FIG. 3. Moreover, subsequent operation is almost the same as that in the timing chart shown in FIG. 3.

It is possible to easily consider a method for setting the number of times of addition to a value other than three.

For example, when the number of times of addition increases, the charge adding capacitor 32 is saturated. Therefore, the capacitance value of the capacitor 32 is set to a value larger than that of the vertical signal line 10. For the charges added to the charge adding capacitor 32 to be input to the noise suppression circuit 14, the noise suppression circuit 14 must use a gate input. For this, a circuit disclosed in the Jpn. Pat. Appln. KOKAI Publication No. 64-2354/1989 is not suitable which requires a large charge value so as to charge a clamp capacitance.

FIG. 10 is a circuit diagram showing a structure of a gate-input noise suppression circuit 14A.

In the case of the gate-input noise suppression circuit 14A in FIG. 10, a gate-input circuit comprising a noise suppression amplifying transistor 39 and a noise suppression load transistor 40 is provided for the front stage of a correlation dual-sampling noise suppression circuit comprising a clamp capacitor 41, a clamp transistor 42, a sample hold transistor 43, and a sample hold capacitor 44.

In the case of the noise suppression circuit 14A in FIG. 10, charges to be transferred from the vertical signal line 10 to the charge adding capacitor 32 may be fluctuated due to the fluctuation of the threshold voltage of the amplified charge transfer transistor 31. To control the fluctuation, it is possible to constitute the charge adding circuit 30 by modifying it as described below.

For example, as shown in FIG. 11, a charge adding circuit 30A has a structure in which an amplified charge transfer transistor gate driving capacitor 46 is connected between the gate of the amplified charge transfer transistor 31 and the amplified charge transfer transistor common gate 34 and a feedback transistor 47 is connected between the gate and drain of the amplified charge transfer transistor 31. Reference number 48 denotes a feedback transistor common gate. Thereby, it is possible to control the fluctuation of charges in each column.

Moreover, FIG. 12 shows an example of a circuit for performing the correction of threshold fluctuation and addition of charges separately.

As shown in FIG. 12, a charge adding circuit 30B comprises the amplified charge transfer transistor 31, the charge adding capacitor 32, the charge adding capacitor reset transistor 33, and the feedback transistor 47. Moreover, the circuit 30B is constituted by connecting a second amplified charge transfer transistor 31' and a second charge adding capacitor 32' to the drain of the amplified charge transfer transistor 31. Reference number 34' denotes an amplified charge transfer transistor common gate.

FIG. 13 is a circuit diagram showing still another structure of the charge adding circuit.

As shown in FIG. 13, a charge adding circuit 30C is constituted by combining the charge adding circuits 30A and 30B in FIG. 11. That is, the circuit 30C has a structure in which the second amplified charge transfer transistor 31' and second charge adding capacitor 32' are connected to the drain of the amplified charge transfer transistor 31 of the charge adding circuit 30A.

In general, when an image sensor is used for a camera, the amplification factor of an external amplifier for amplifying an output signal is variable in order to make the sensitivity variable. In the case of the charge adding circuit, it is possible to change amplification factors by the output of an image pickup device without using an external amplifier by changing the addition frequencies of the circuit. An automatic sensitivity adjusting function in which the amplification factor increases for a portion having a low luminance in order to photograph a portion having a low luminance and a portion having a high luminance can be realized by constituting a system so that the addition frequencies of a charge adding circuit are automatically changed.

Moreover, in the case of the charge adding circuit, a voltage is amplified by adding signal charges. However, it is also possible to amplify a voltage by one-time transfer operation without performing addition. In this case, it is necessary to set the capacitance of the charge adding capacitor 32 to a value larger than that of the vertical signal line 10.

FIG. 14 is a circuit diagram showing a structure of a charge adding circuit for amplifying a voltage by transferring the signal charges once.

In FIG. 14, a charge adding circuit 30D has a structure in which the sources of charge adding capacitor select transistors 49a to 49c for selecting first to third charge adding capacitors 32a to 32c are arranged in parallel at a joint between the amplified charge transfer transistor 31 and the charge adding capacitor reset transistor 33. Moreover, the charge adding capacitors 32a to 32c for storing amplified charges are connected to the drains of the charge adding capacitor select transistors 49a to 49c and number-of-transistor select lines 50a to 50c for selecting the transistors 49a to 49c are connected to the gates of the transistors 49a to 49c.

Thus, the charge adding circuit 30D is provided with a plurality of charge adding capacitors (three capacitors in FIG. 14) for storing amplified charges. Moreover, to make an amplification factor variable, the number of capacitors in which charges are stored in a charge adding capacitor is selected by selecting switches of the charge adding capacitor select transistors 49a to 49c. That is, amplification factors of a voltage are changed in accordance with the selected number of charge adding capacitors.

Moreover, it is possible to use a structure using a variable capacitance for changing capacitance values by the bias of a diode or the like as a method of amplifying a voltage by transferring signal charges once.

FIG. 15 is a circuit diagram showing a structure of the charge adding circuit. A charge adding circuit 30E has a structure in which a parallel circuit comprising a charge adding circuit 32 and a diode 51 is connected to a joint between the amplified charge transfer transistor 31 and the charge adding capacitor reset transistor 33. Moreover, a diode bias line 52 is connected to another joint between the charge adding capacitor 32 and the diode 51.

The charge adding circuit 30E in FIG. 15 changes amplification factors by changing voltages in accordance with the control of the diode bias line 52 and thereby changing capacitance of the diode 51.

As described above, it is also possible to amplify a voltage by one-time transfer operation without adding signal charges.

In the case of the first embodiment, a case is shown in which the charge adding circuit 0 is set between the vertical signal line 10 and the noise suppression circuit 14. However, it is also possible to set the charge adding circuit 30 to the rear stage of the noise suppression circuit 14.

The amplifying solid-state image pickup device according to the first embodiment and its operating method include the following inventions.

(1) An amplifying solid-state image pickup device comprises: an image pickup region formed by two-dimensionally arranging photosensitive cells, each of said photosensitive cells including photoelectric conversion means, signal charge storage means, signal charge ejection means, row select means, and amplification means on a semiconductor substrate; a plurality of vertical select lines arranged in said image pickup region in a row direction; vertical select means for driving said plurality of vertical select lines; a plurality of vertical signal lines arranged in the column direction to read the outputs of said amplification means; noise suppression means provided at the ends of said plurality of vertical signal lines to capture and deduct noises and signals appearing on said plurality of vertical signal lines at time differences; horizontal select lines arranged in a column direction; horizontal read means for relaying the outputs of said horizontal select lines and said noise suppression means; horizontal select means for driving said horizontal read means; and charge adding means for adding the signal charges read to said vertical signal lines.

(2) In the above (1), the charge adding means includes vertical signal line charge transfer means for transferring charges to said vertical signal lines and an added charge storage capacitor for storing the charges transferred by said vertical signal line charge transfer means.

(3) In the above (2), added charge ejection means for discharging the charges stored in the added charge storage capacitance is further included.

(4) In the above item (3), the vertical signal charge transfer means comprises a MOS transistor and a feedback MOS transistor connected between the gate electrode of the MOS transistor and the drain to which the added charge storage capacitance.

(5) In the above items (1) to (4), the electric capacity value of the added charge storage capacitance is larger than the electric capacity value of the vertical signal line.

(6) In the above items (1) to (5), the noise suppression means is constituted by including at least one MOS transistor and the output of the charge adding means must be input to the gate of the MOS transistor.

(7) An amplifying solid-state image pickup device operating method, which includes the steps of driving a plurality of vertical select lines arranged in the row direction of an image pickup region formed by two-dimensionally arranging photosensitive cells respectively comprising photoelectric conversion means, signal charge storage means, signal charge election means, row select means, and amplification means on a semiconductor substrate, reading the outputs of said amplification means by a plurality of vertical signal lines arranged in the column direction, capturing and deducting noises and signals appearing on said vertical signal lines at time differences by noise suppression means provided at the ends of said vertical signal lines, relaying the outputs of horizontal select lines arranged in the column direction of said image pickup region and noise suppression means by horizontal read means, and driving said horizontal read means by horizontal select means; the method comprises the steps of: performing a plurality of times of amplification for signals for one time stored in said signal charge storage means; and deducting noises obtained by adding amplified noises a plurality of times in said step of performing a plurality of times of amplification from the signals obtained by adding the amplified signals generated on the vertical signal lines a plurality of times in said step by said noise suppression means.

(8) In the above (7), sensitivities are changed by changing the number of times of addition in said step of performing a plurality of times of amplification.

(9) In the above item (8), the second step must adjust a sensitivity by making the number of times of addition variable in accordance with incident amount of light.

(10) An amplifying solid-state image pickup device operating method comprising the steps of driving a plurality of vertical select lines arranged in the row direction of an image pickup region in which photosensitive cells respectively including photoelectric conversion means, signal charge storage means, signal charge ejection means, row select means, and amplification means are two-dimensionally arranged on a semiconductor substrate with vertical select means, reading outputs of the amplification means by a plurality of vertical signal lines arranged in the column direction of the image pickup region, capturing and deducting noises and signals appearing on the vertical signal lines at time differences by noise suppression means provided for ends of the vertical signal lines, setting charge integration means comprising a feedback MOS transistor and an integrated charge storage capacitance between the gate electrode of a MOS transistor set between a vertical signal line and noise suppression means and the drain of the MOS transistor to which the integrated charge storage capacitance is connected and relaying outputs of the horizontal lines arranged in the column direction of the image pickup region and the noise suppression means by horizontal read means, and driving the horizontal read means by horizontal select means comprises the steps of supplying a reference voltage to the vertical signal lines, driving the feedback MOS transistor when supplying the reference voltage to the vertical signal lines, amplifying signals for one time stored in the signal charge storage means a plurality of times after driving the feedback MOS transistor, and deducting signals and noises added by driving the feedback transistor from the noise suppression means when adding a plurality of amplified signals and a plurality of amplified noises generated in the vertical lines by the amplifying step a plurality of times.

(11) An amplifying solid-state image pickup device comprises: an image region formed by two-dimensionally arranging photosensitive cells respectively including photoelectric conversion means, signal charge storage means, signal charge ejection means, row select means, and amplification means on a semiconductor substrate; a plurality of vertical select lines arranged in said image pickup region in a row direction; vertical select means for driving said plurality of vertical select lines; a plurality of vertical signal lines arranged in the column direction to read the outputs of said amplification means; noise suppression means provided at the ends of said vertical signal lines to capture and deduct noises and signals appearing on said plurality of vertical signal lines at time differences; horizontal select lines arranged in a column direction; horizontal read means for relaying the outputs of said horizontal select lines and said noise suppression means; horizontal select means for driving said horizontal read means; and voltage amplification means for amplifying signal voltages read to said vertical signal lines.

(12) In the above item (11), the voltage amplification means has vertical signal line charge transfer means for transferring charges to the vertical signal lines and a voltage amplified charge storage capacitance for storing charges transferred by the vertical signal line charge transfer means.

(13) In the above item (12), the electric capacity value of the voltage amplified charge storage capacitance is smaller than the electric capacity value of the vertical signal lines.

(14) In the above item (11), the voltage amplified charge ejection means for discharging the charges stored in the voltage amplified charge storage capacitance is further included.

(15) In the above item (11), the vertical signal line charge transfer means has a MOS transistor and a feedback MOS transistor connected between the gate electrode of the MOS transistor and the drain connecting with the voltage amplified charge storage capacitance.

(16) In the above items (11) to (15), the noise suppression means includes at least one MOS transistor and the output of the voltage amplification means is input to the gate of the MOS transistor.

(17) In the above item (12), the electric capacity value of the voltage amplified charge storage capacitance is variable in accordance with an external signal input from an external unit.

(18) In the above item (17), the voltage amplified charge storage capacitance is constituted with a capacitance-variable transistor and a plurality of divided capacitances.

(19) An amplifying solid-state image pickup device operating method comprising the steps of driving a plurality of vertical select lines arranged in the row direction of an image pickup region in which photosensitive cells respectively including photoelectric conversion means, signal charge storage means, signal charge ejection means, row select means, and amplification means are two-dimensionally arranged on a semiconductor substrate with vertical select means, reading outputs of the amplification means by a plurality of vertical signal lines arranged in the column direction of the image pickup region, capturing and deducting noises and signals appearing on the vertical signal lines at time differences by noise suppression means provided for ends of the vertical signal lines, setting charge integration means comprising a feedback MOS transistor and an integrated charge storage capacitance between the gate electrode of a MOS transistor set between a vertical signal line and noise suppression means and the drain of the MOS transistor to which the integrated charge storage capacitance is connected and relaying outputs of the horizontal lines arranged in the column direction of the image pickup region and the noise suppression means by horizontal read means, and driving the horizontal read means by horizontal select means comprises the steps of supplying a reference voltage to the vertical signal lines, driving the feedback MOS transistor when supplying the reference voltage to the vertical signal lines, and deducting voltage amplified signals and noises from the noise suppression means without driving the feedback MOS transistor when transferring the amplified signals and amplified noises to the voltage amplification and storage capacitance through the MOS transistor.

(20) An amplifying solid-state image pickup device operating method, which includes the steps of driving a plurality of vertical select lines arranged in the row direction of an image pickup region formed by two-dimensionally arranging photosensitive cells respectively comprising photoelectric conversion means, signal charge storage means, signal charge election means, row select means, and amplification means on a semiconductor substrate, reading the outputs of said amplification means by a plurality of vertical signal lines arranged in the column direction, capturing noises and signals appearing on said vertical signal lines at time differences and deducting the noise from the signals by noise suppression means provided at the ends of said vertical signal lines, relaying the outputs of horizontal select lines arranged in the column direction of said image pickup region and noise suppression means by horizontal read means by setting charge integration means comprising vertical signal line charge transfer means and a variable voltage amplification and storage capacitance making it possible to control a variable electric capacity value from an external unit between said vertical signal lines and said noise suppression means, and driving said horizontal read means by horizontal select means; the method comprises the steps of: supplying a capacitance variable signal from an external unit; and controlling the sensitivity by changing the electric capacity values of said voltage amplification and storage means.

(21) In the above item (20), sensitivity is adjusted by making the electric capacity value variable in accordance with incident amount of light.

Figure 16:
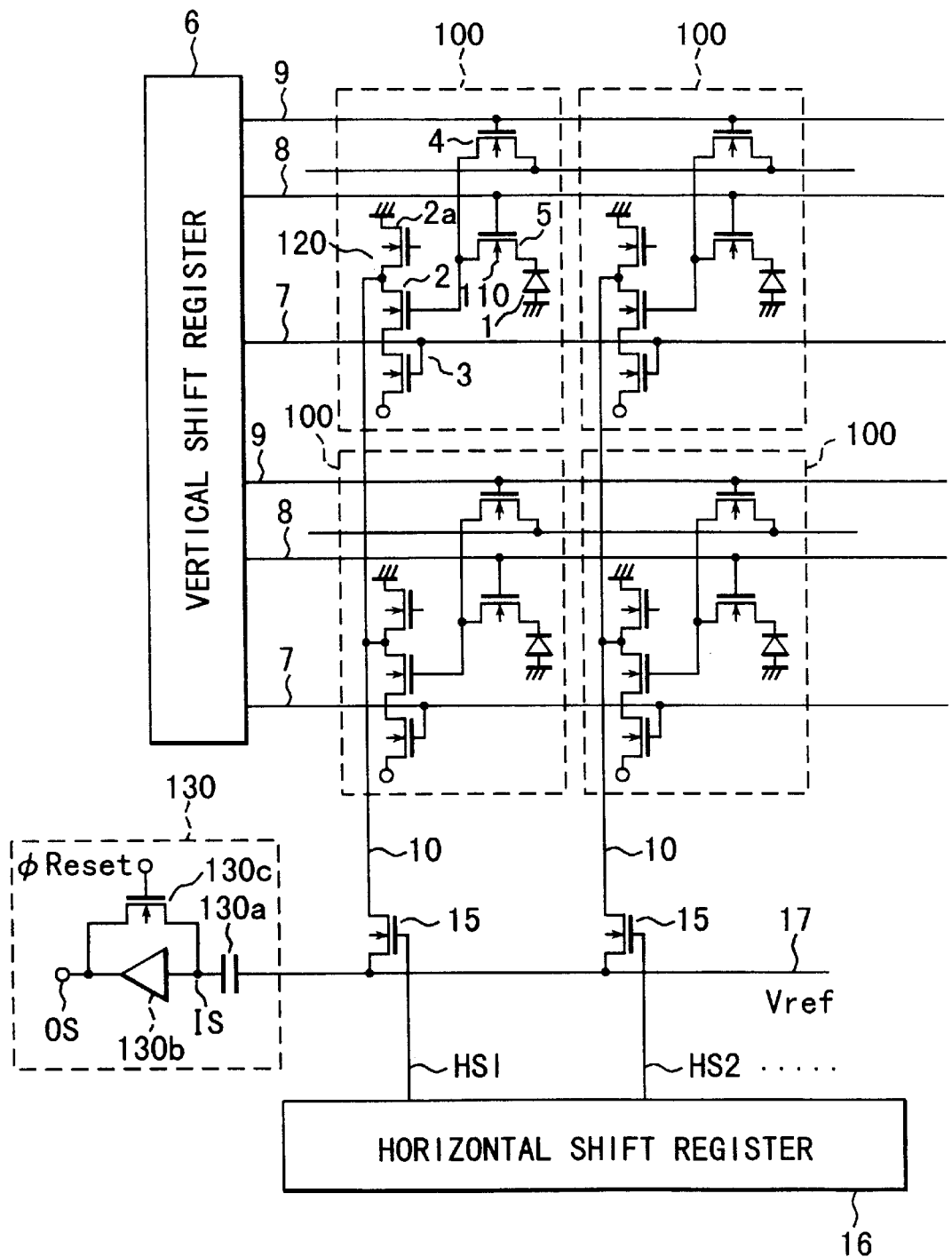
FIG. 16 is a circuit diagram showing a structure of the amplifying solid-state image pickup device according to the second embodiment of the present invention using a single horizontal line.

FIG. 16 shows the amplifying solid-state image pickup device according to the second embodiment of the present invention. In FIG. 16, a portion same as that in FIG. 7 is provided with the same symbol and its detailed description is omitted.

According to FIG. 16, a plurality of photoelectric conversion sections 100 are arranged in rows and columns. Each photoelectric section 100 comprises photoelectric conversion circuits 110 and amplifiers 120. Each photoelectric conversion circuit 110 comprises a photoelectric conversion device, that is, the photodiode 1 and the signal charge transfer transistor 5. Each amplifier 120 comprises MOS transistors 2a, 2, and 3 connected in series to amplify signals of the photodiode 1. The source of the transistor 2a is grounded and the gate of the amplifying transistor 2 is connected to the drain of the signal charge transfer transistor 5. When a photoelectric conversion signal at the minimum level of the photodiode 1 is input to the gate of the amplifying transistor 2 through the signal charge transfer transistor 5, the signal is amplified by the amplifier 120 up to a predetermined level. The transistor 4 is a reset transistor.

The photoelectric conversion sections 100 arranged in the row direction are connected to the vertical register 6 through the reset line 9, the charge transfer control line 8 and the horizontal address line 7. That is, the reset line 9 is connected to the gate of the reset transistor 4 of each photoelectric conversion section 100. The charge transfer control line 8 is connected to the gate of the MOS signal charge transfer transistor 5 of the photoelectric conversion circuit 110. The horizontal address line 7 is connected to the gate of the vertical select transistor 3 of the amplifier 120.

The photoelectric conversion sections 100 arranged in the column direction are connected to the horizontal signal line 17 through the vertical signal line 10 and the horizontal select transistor 15. That is, the output node of the amplifier 120 of the photoelectric conversion section 100 is connected to the horizontal signal line 17 through the source and drain of the horizontal select transistor 15. The gate of the horizontal select transistor 15 is connected to the output of the horizontal shift register 16.

The horizontal signal line 17 is connected to an output amplifier 130. The output amplifier 130 comprises a capacitor 130a connected to the horizontal signal line 17, a differential amplifier 130b having an input end connected to the horizontal signal line 17 through the capacitor 130a, and a MOS transistor 130c connected between the input and output of the differential amplifier 130b to constitute a negative feedback circuit.

Then, the operation of a MOS amplifying solid-state image pickup device having the above structure will be described below.

The horizontal signal line 17 is always biased by a voltage Vref serving as a reference voltage. Therefore, the capacitor 130a connected to the horizontal signal line 17 in series is charged at a reference potential. In this state, the signal charge transfer transistor 5 is turned on, when a read signal is supplied to the gate of the signal charge transfer transistor 5 from the vertical shift register 18 through the charge transfer control line 8. In this case, a signal generated by the photodiode 1, i.e., a photoelectric conversion signal is supplied to the vertical shift register 18 through the signal charge transfer transistor 5. The amplifier 120 reads an amplified signal of the photoelectric conversion signal to the vertical signal line 10 in response to an address signal sent from the vertical shift register 18 through the horizontal address line 7. The signal read to the vertical signal line 10 is selected by the horizontal select transistor 15 controlled by the horizontal shift register 16 and read to the horizontal signal line 17. A positive or negative signal of the horizontal signal line 17 changes stored charges of the capacitor 130a and a potential change corresponding to the change of the stored charges serves as an effective input of the differential amplifier 130b. After the positive or negative signal is amplified by the differential amplifier 130b, a switching device constituting a negative feedback circuit, i.e., the MOS transistor 130c is turned on by a reset pulse $\phi_{RESET}$ and thereby, the capacitor 130a is reset.

Figure 5:
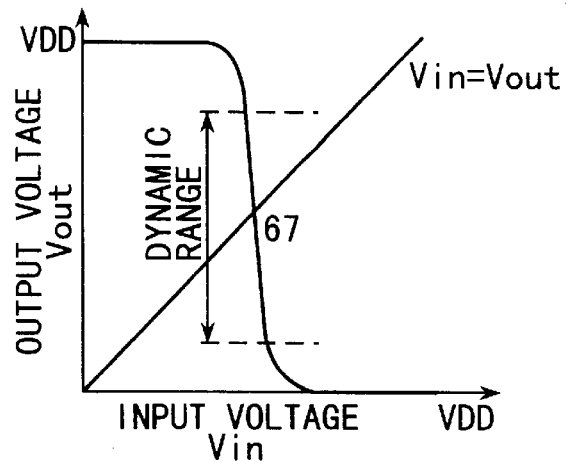
FIG. 5 is an operation characteristic of an amplifier.
Figure 6:
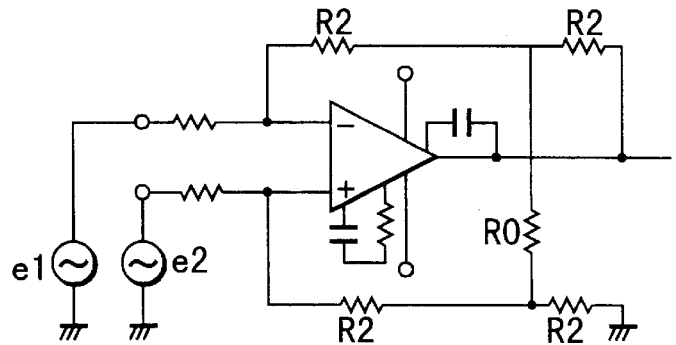
FIG. 6 is a conventional differential amplifier.

As described above, by setting a negative feedback circuit between the input and output of an amplifier and using the output amplifier 130 in which a capacitor is connected to an input in series, it is possible to shift an operating point to a potential in which input and output are equalized by the autobias effect as shown by the conventional example in FIG. 5 and extend an effective operating region. Therefore, even when the threshold of a transistor fluctuates on a process, it is possible to decrease the deviation of the operating region and stabilize operations.

Figure 17:
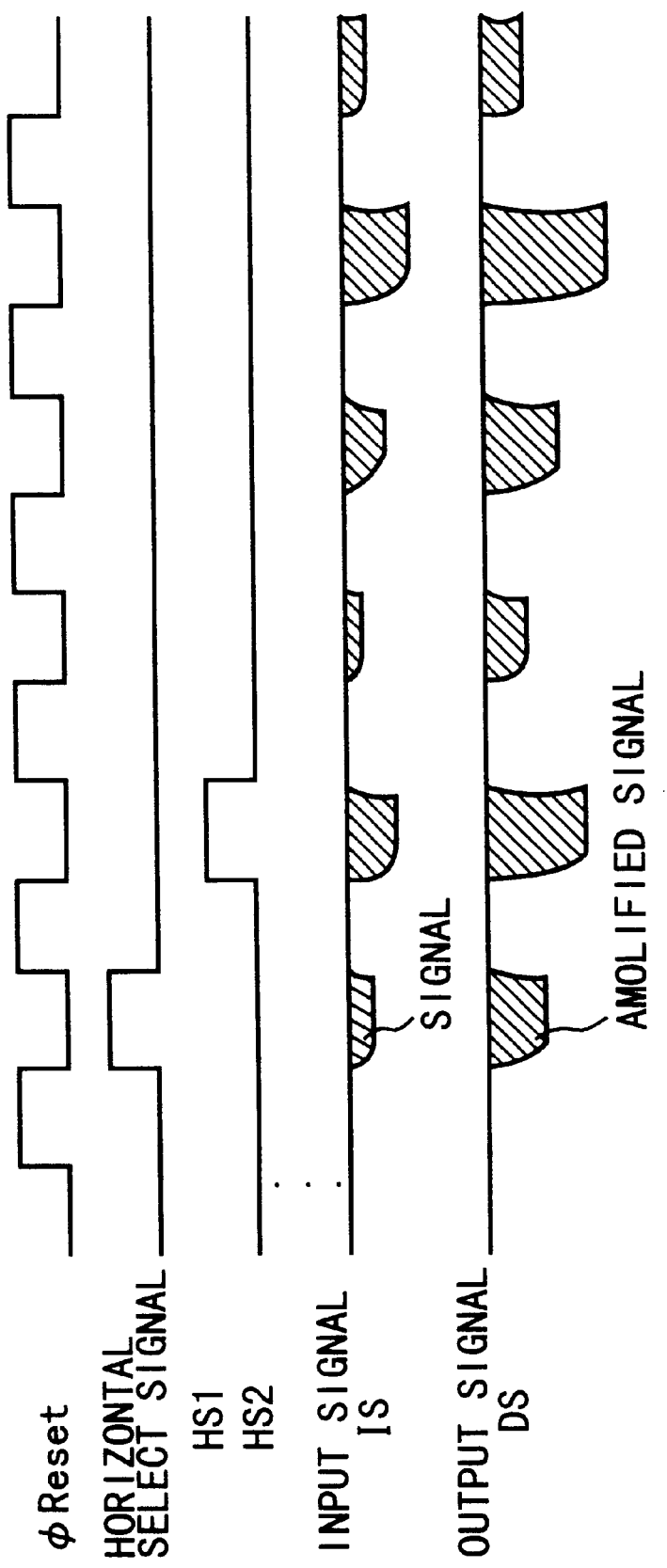
FIG. 17 is a timing chart of signals of various sections of the amplifying solid-state image pickup device in FIG. 16.

FIG. 17 shows the timing of each signal in the circuit in FIG. 16. A reset pulse $\phi_{RESET}$ and horizontal select signals HS1, HS2, . . . are thus alternately set in time series, the input of the entire circuit including a feedback circuit becomes a reference voltage at the time of resetting, the feedback circuit is turned on, and the input and output of the differential amplifier 130b are equalized.

Moreover, at the time of non-resetting, an input signal IS is amplified and output as an output signal OS. In this case, the timing of a horizontal select signal HS and that of resetting can be simultaneous. Moreover, the reset transistor 130c is turned on in a horizontal blanking period and the bias of the differential amplifier 130b is set, and thereafter signals are read from a plurality of vertical signal lines 10. However, it is also possible to use a driving method (horizontal clamp method) of not resetting the reset transistor 130c while signals are read from the vertical signal lines 10.

Figure 18:
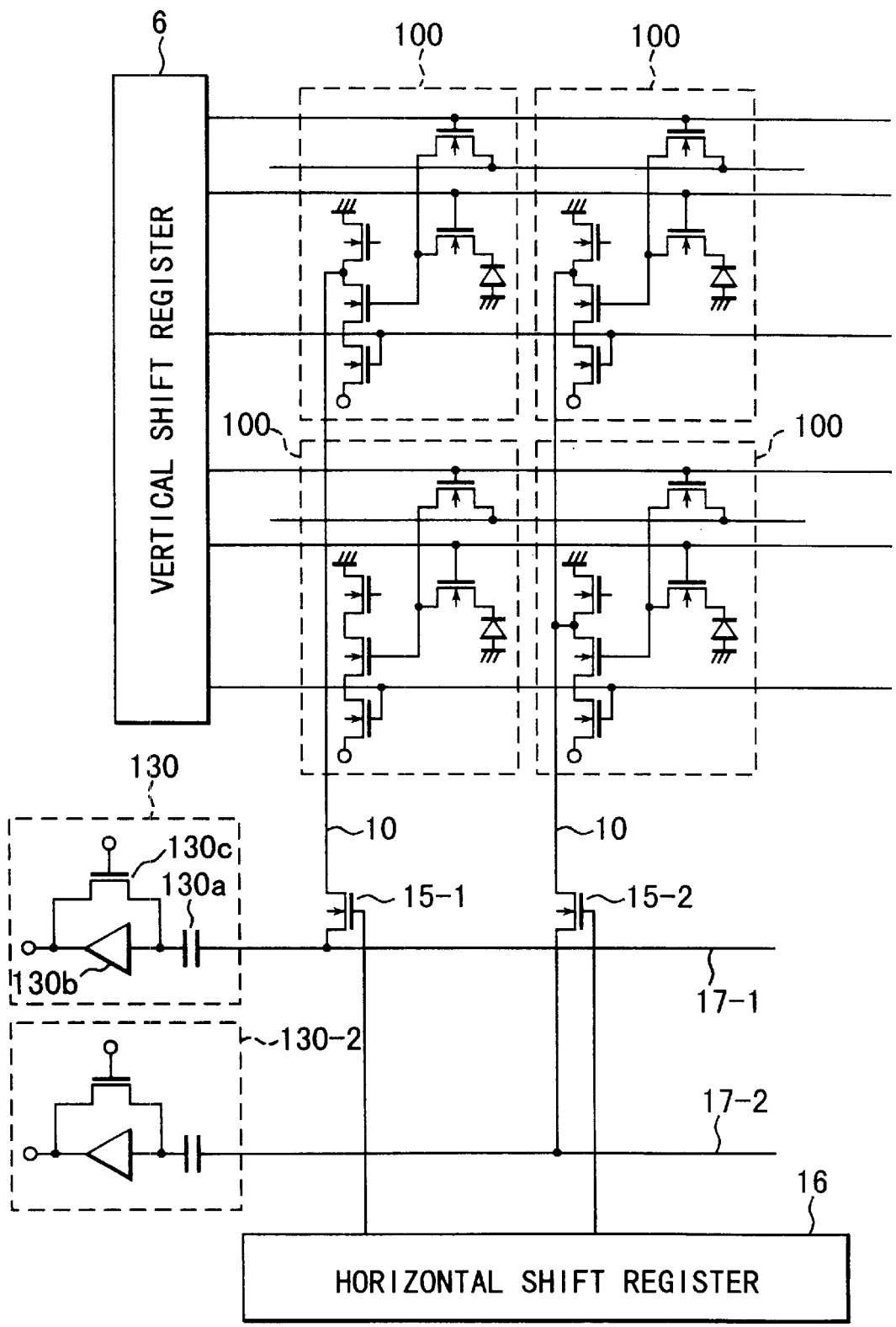
FIG. 18 is a circuit diagram showing a structure of the solid-state image pickup device according to the third embodiment of the present invention using a plurality of horizontal signal lines.

FIG. 18 shows the third embodiment in which a plurality of horizontal signal lines 17-1 and 17-2 are set to an amplifying solid-state image pickup device. According to the third embodiment, the horizontal signal lines 17-1 and 17-2 are connected to horizontal select transistors 15-1 and 15-2 and moreover, connected to a plurality of output amplifiers 130-1 and 130-2, respectively.

In the case of this embodiment, because signals selected by the horizontal select transistors 15-1 and 15-2 are read by the horizontal signal lines 17-1 and 17-2, it is possible to accelerate signal reading. In the case of this embodiment, only two horizontal signal lines and only two output amplifiers are shown. However, it is possible to further accelerate signal reading by using more than two signal lines and output amplifiers.

Figure 19:
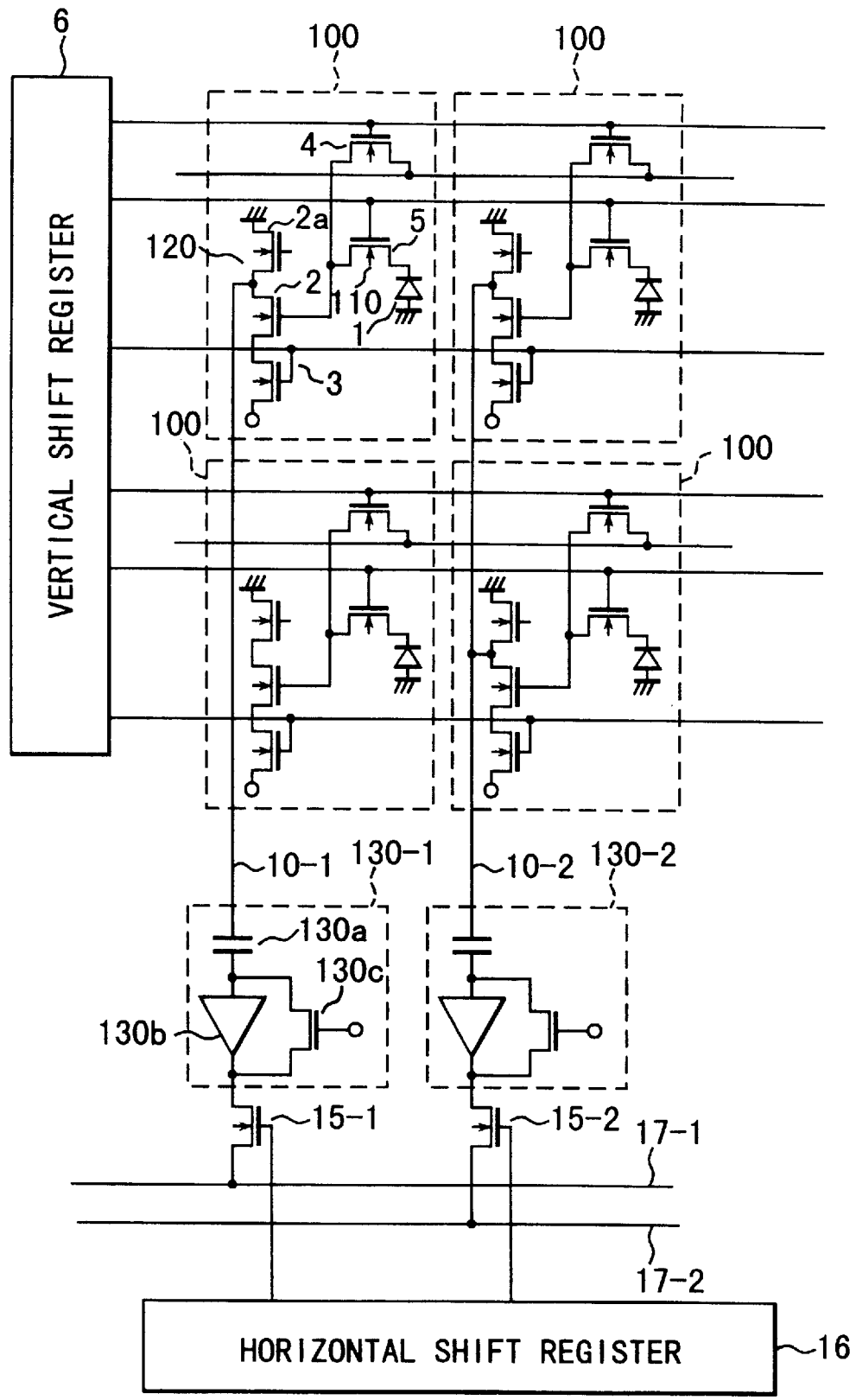
FIG. 19 is a circuit diagram showing a structure of the amplifying solid-state image pickup device according to the fourth embodiment of the present invention including an amplifier in a vertical signal line.

FIG. 19 shows the fourth embodiment in which amplifiers 130-1 and 130-2 are connected to each vertical signal line. That is, vertical lines 10-1 and 10-2 are connected to the horizontal signal lines 17-1 and 17-2 one each through the amplifiers 130-1 and 130-2 and horizontal select transistors 15-1 and 15-2.

In the case of this embodiment, photoelectric conversion signals of the vertical signal lines 10-1 and 10-2 are respectively amplified by the amplifiers 130-1 and 130-2 and read to the horizontal signal lines 17-1 and 17-2 by the horizontal select transistors 15-1 and 15-2.

That is, a photoelectric conversion signal generated by a photodiode "a" is read by a transistor 12b, amplified by the amplifier 120, and read to the vertical signal lines 10-1 and 10-2. Signals read to the vertical signal lines 10-1 and 10-2 are amplified by the amplifiers 130-1 and 130-2, thereafter selected by the horizontal select transistors 15-1 and 15-2, and read to the horizontal signal lines 17-1 and 17-2.

It is possible to replace each of the amplifiers 130, 130-1, and 130-2 of the second to fourth embodiments with the amplifier 200 shown in FIG. 20. The amplifier 200 uses a differential amplifier 210 in which a signal is input to an input and a reference voltage is input to another input. In the case of the amplifier 200, a positive or negative signal selected by the vertical or horizontal select transistor 15 and read to the horizontal or vertical signal line 10 is input to the non-inverting input end of the amplifier 210 through a capacitor 223-1. The inverting end of the differential amplifier 210 is connected to a reference power supply 225 through a capacitor 223-2. The differential amplifier 210 amplifies the difference voltage between input signals applied to the non-inverting and inverting input ends and reads it to output ends 226-1 and 226-2. Thereafter, when a reset signal $\phi_{RESET}$ to be input to the gates of MOS transistors 220-1 and 220-2 becomes high and the MOS transistors 220-1 and 220-2 are turned on, the voltage levels of the input and output ends of the amplifier 210 are equalized.

FIG. 21 shows another example of the amplifiers 130, 130-1, and 130-2 in FIGS. 16, 18, and 19. The amplifier 230 in FIG. 21 comprises an amplifier using a CMOS inverter, reset transistor, and input capacitor. Specifically, when a power supply voltage is applied to terminals 234 and 238 of the amplifier 230, gm of a load MOS transistor 229 is controlled and the amplification factor is adjusted in accordance with a signal supplied to a terminal 235.

That is, the signal is input to the gate of a driving MOS transistor 231 from an input terminal 237 through a capacitor 232 and amplified and then, output from an output terminal 239. Thereafter, the circuit is reset and a bias is applied so that a node 270 and an output terminal 239 are equalized. In the case of the circuit, the S/N ratio is improved by a feedback circuit comprising a reset transistor 260 and the input capacitor 232 and the dynamic range is improved by adjusting the operating point. Because the circuit is very simple, it is very effective when several-fold gain is necessary.

FIG. 22 shows a modification of the amplifier in FIG. 20 based on a differential amplifier. In the case of the modification, a power supply voltage is applied to terminals 240 and 241. A reference voltage or a signal of the above-described signal line when there is no signal is input to an input terminal 227-1 and a signal is input to an input terminal 227-2. Signals input to transistors 246-1 and 246-2 through capacitors 223-1 and 223-2 are amplified by a differential amplifier comprising load MOS transistors 245-1 and 245-2, driving MOS transistors 246-1 and 246-2, and a constant current source 247 and output to the output ends 226-1 and 226-2. Thereafter, reset transistors 228-1 and 228-2 are turned on and the circuit is reset and biased so that the voltage levels of input and output are equalized.

The present circuit sets a standard gain by properly adjusting the channel widths of a load PMOS and a driving NMOS so that a PMOS transistor serving as a load becomes a short channel and thus, a final gain G2 is controlled by a control voltage input to a terminal 244. Moreover, it is possible to finely adjust the gain by connecting the terminal 244 with an output through an NMOS transistor 248 and controlling the gate of the NMOS transistor as shown in FIG. 23.

In the case of the circuit of the amplifying solid-state image pickup device, the effect due to coupling of transistors such as plunge of a reset pulse appears on each signal line and thereby, an output signal does not become 0 even if there is no optical signal because reference voltages at the time of resetting are changed.

Figure 24:
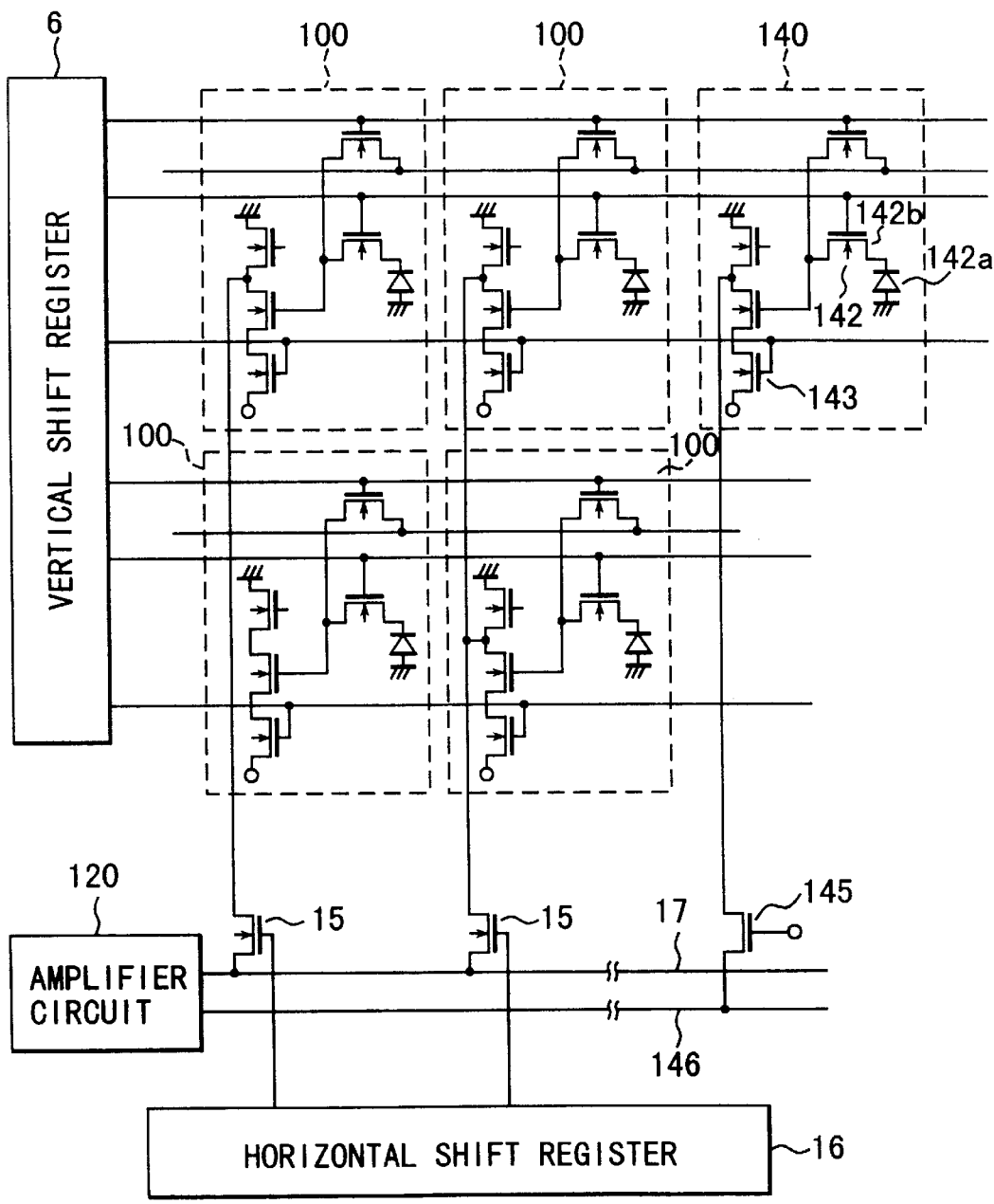
FIG. 24 is an illustration showing a structure of the amplifying solid-state image pickup device according to the fifth embodiment of the present invention including a dummy circuit and a variable gain amplifier.

FIG. 24 is an illustration showing a structure obtained by improving the above disadvantage. The amplifying solid-state image pickup device shown in FIG. 24 is constituted by adding a dummy circuit 140 comprising a photodiode 142a, vertical select transistor 142b, horizontal select transistor 145, and horizontal signal line 146 to the circuit in FIG. 16. The gate voltage of the horizontal select transistor 145 of the dummy circuit 140 is applied alternately with a reset pulse and a dummy signal when an optical signal is 0, that is, including only noises such as coupled reset pulses is sent to the dummy horizontal signal line 146 at the whole signal timing. By using the dummy signal of the dummy circuit 140 as a reference input, it is possible to cancel the effect such as the coupling of pulses.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

We claim:

1. A solid-state image pickup device comprising:
   a plurality of photoelectric conversion sections arranged in rows and columns and respectively serving as a photoelectric conversion device and an amplification device for amplifying the signals of said photoelectric conversion device;

a plurality of vertical signal lines for reading signals from said photoelectric conversion sections;

a vertical select circuit for selecting said row-arranged photoelectric conversion sections;

a horizontal select circuit for selecting said vertical signal lines;

horizontal signal lines for reading signals from said vertical signal lines in accordance with the selection of said vertical signal lines;

an amplifier for amplifying the signals of said horizontal signal lines, which has a negative feedback path; and means for selecting said vertical signal lines and resetting said amplifier.

2. An amplifying solid-state image pickup device according to claim 1, wherein said horizontal signal lines have a plurality of horizontal signal lines for respectively reading the signals of a plurality of vertical select lines selected by said horizontal select circuit and said amplifier has a plurality of amplifiers for respectively amplifying signals of a plurality of said horizontal signal lines.

3. An amplifying solid-state image pickup device according to claim 1, wherein a dummy circuit for reading a reference signal to said horizontal signal lines and said amplifier comprises a differential amplifier for amplifying the difference between the signals of said horizontal signal lines and the reference signal of said dummy circuit.

4. An amplifying solid-state image pickup device according to claim 1, wherein said amplifier comprises a capacitor and amplification unit connected to said signal lines in series, and a switching circuit for equalizing the potential of the input of said amplification unit with that of the output of the unit.

5. An amplifying solid-state image pickup device according to claim 4, further comprising means for turning on said switching circuit and setting the input voltage of said amplification unit to a predetermined voltage.

6. An amplifying solid-state image pickup device according to claim 4, wherein said amplifier reads a plurality of bits including one bit for one-time operation of said switching circuit.

7. An amplifying solid-state image pickup device according to claim 1, wherein said amplifier comprises a MOS differential amplification unit including a MOS inverter circuit provided with a load MOS transistor and a driving MOS transistor, a pair of load MOS transistors, a pair of differential input transistors, and a constant-current source and the gate potentials of said load MOS transistors are directly controlled and gm (mutual conductance) is changed to obtain an optional gain.

8. An amplifying solid-state image pickup device comprising:

a plurality of photoelectric conversion sections arranged in rows and columns and respectively including a photoelectric conversion device and an amplification device for amplifying the signal of said photoelectric conversion device;

a plurality of vertical signal lines for reading signals from said photoelectric conversion sections;

a vertical select circuit for selecting said photoelectric conversion sections in a row direction;

a horizontal select circuit for selecting said plurality of vertical signal lines;

a plurality of amplifiers for amplifying the signals of said vertical signal lines, each of which has a negative feedback path;

horizontal signal lines for reading signals from said vertical signal lines in accordance with the selection of said vertical signal lines; and means for selecting said vertical signal lines and resetting said amplifier.

9. An amplifying solid-state image pickup device according to claim 8, wherein a dummy circuit for reading a reference signal to said horizontal signal lines and said amplifier comprises a differential amplifier for amplifying the difference between the signals of said horizontal signal lines and the reference signal of said dummy circuit.

10. An amplifying solid-state image pickup device according to claim 8, wherein said amplifier comprises a capacitor and amplification unit connected to said signal lines in series, and a switching circuit for equalizing the potential of the input of said amplification unit with that of the output of the unit.

11. An amplifying solid-state image pickup device according to claim 10, further comprising means for turning on said switching circuit and setting the input voltage of said amplification unit to a predetermined voltage.

12. An amplifying solid-state image pickup device according to claim 10, wherein said amplifier reads a plurality of bits including one bit for one-time operation of said switching circuit.

13. An amplifying solid-state image pickup device according to claim 8, wherein said amplifier comprises a MOS differential amplification unit including a MOS inverter circuit provided with a load MOS transistor and a driving MOS transistor, a pair of load MOS transistors, a pair of differential input transistors, and a constant-current source and the gate potentials of said load MOS transistors are directly controlled and gm (mutual conductance) is changed to obtain an optional gain.

* * * * *